United States Patent
Tanaka et al.

(10) Patent No.: US 6,272,415 B1
(45) Date of Patent: Aug. 7, 2001

(54) SHIFT CONTROL APPARATUS OF WORKING VEHICLE

(75) Inventors: Satoshi Tanaka, Oyama; Kouji Uematsu, Kodaira, both of (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/552,157

(22) Filed: Apr. 14, 2000

(30) Foreign Application Priority Data

| Apr. 15, 1999 | (JP) | 11-107753 |
| Apr. 19, 1999 | (JP) | 11-110610 |
| Apr. 22, 1999 | (JP) | 11-115570 |
| Jun. 17, 1999 | (JP) | 11-171680 |

(51) Int. Cl.$^7$ .................................. B60K 41/06
(52) U.S. Cl. ............................. 701/54; 477/125
(58) Field of Search ................. 701/51, 54, 55; 477/120, 143, 155, 900, 904, 125, 131, 901, 129, 3, 16, 20; 475/278, 284

(56) References Cited

U.S. PATENT DOCUMENTS

| 4,658,676 | * | 4/1987 | Furusawa et al. | 74/866 |
| 4,836,057 | * | 6/1989 | Asayama et al. | 74/867 |
| 4,854,194 | * | 8/1989 | Kaneko et al. | 74/866 |
| 5,172,609 | * | 12/1992 | Nitz et al. | 74/866 |
| 5,203,234 | * | 4/1993 | Asada et al. | 74/866 |
| 5,690,074 | * | 11/1997 | Ogawa | 123/491 |
| 5,720,690 | * | 2/1998 | Hara et al. | 477/20 |
| 6,062,330 | * | 5/2000 | Watson et al. | 180/248 |

FOREIGN PATENT DOCUMENTS

| 57-149348 | 10/1956 | (JP) . |
| 9-509237 | 9/1997 | (JP) . |

* cited by examiner

Primary Examiner—Tan Nguyen
Assistant Examiner—Dalena Tran
(74) Attorney, Agent, or Firm—Armstrong, Westerman, Hattori, McLeland & Naughton, LLP

(57) ABSTRACT

The invention provides a shift control apparatus of a working vehicle in which an excellent shift operability can be obtained without reference to an incline of a travelling road, a loading amount and a road condition without necessity of learning a time for controlling an engine. Accordingly, a controller outputs a command for setting a hydraulic pressure (Pn) of a clutch before a shift operation to 0 value at a time of starting the shift operation and a command for making a hydraulic pressure (Pa) of a clutch after the shift operation be gradually increased in point of time to an electromagnetic proportional control valve (16), changes a fuel injection amount command signal (Fi) to a fuel injection apparatus (19) from an accelerator injection amount signal (THo) on the basis of an accelerator pedal operating amount to a synchronous injection amount signal (THc) for controlling an engine rotational speed so that an absolute value of an input shaft conversion relative speed (Nr) is reduced, and changes the fuel injection amount command signal (Fi) from the synchronous injection amount signal (THc) to the accelerator injection amount signal (THo) when the absolute value of the input shaft conversion relative speed becomes smaller than a predetermined threshold (dNr).

9 Claims, 17 Drawing Sheets

SHIFT CONTROL APPARATUS OF WORKING VEHICLE

FIELD OF THE INVENTION

The present invention relates to a shift control apparatus of a working vehicle, and particularly to a shift control apparatus of a dump truck or the like which carries a heavy load and repeats starting, stopping, ascending and descending.

DESCRIPTION OF THE PRIOR ART

A working vehicle, for example, a dump truck, carries a heavy load, in which a transmission having multiple speed stages is used for repeating starting, stopping, ascending and descending and an automatic transmission apparatus is provided with taking an operability of an operator into consideration because of multiple speed stages. A plurality of hydraulic clutches are provided in an inner portion of the transmission, and a speed stage is set by turning on and off a hydraulic pressure to the clutch and combining the clutch to which the hydraulic pressure is applied and the clutch to which no hydraulic pressure is applied. The automatic transmission apparatus determines an up shift for increasing a speed when a transmission output shaft rotational speed becomes greater than a predetermined rotational speed and a down shift for reducing a speed when the transmission output shaft rotational speed becomes smaller than a predetermined rotational speed, in accordance with a speed change graph which is set on the basis of an operation amount of an accelerator pedal and the transmission output shaft rotational speed, and outputs a command to an electromagnetic proportional control valve which controls a hydraulic pressure of the clutch in a corresponding speed stage, thereby performing a shift operation.

When the shift operation is determined, the clutch after the shift operation corresponding to a determined new speed stage has a relative speed which is determined by the transmission output shaft rotational speed, a speed reduction ratio of the speed stage before the shift operation and a speed reduction ration of the speed stage after the shift operation. In this state, since a rotational inertia in a side of a transmission input shaft including a rotational inertia of the engine has a rotational acceleration when gradually increasing the clutch hydraulic pressure in point of time and engaging the clutch while slipping, an inertia torque calculated by multiplying the rotational inertia by the rotational acceleration is generated. The inertia torque is one of reasons by which a shift shock is generated. The inertia torque can be reduced by reducing an incline at which the clutch hydraulic pressure is gradually increased in point of time, however, a time for which the clutch slips becomes long, so that a quantity of heat generated in the clutch is increased and a durability of the clutch is deteriorated. Further, when reducing the incline of the clutch hydraulic pressure, a slow feeling is applied to an operator and a shift operability is not well.

For the purpose of reducing a shift shock of the working vehicle mentioned above so as to improve a shift operability, thereby maintaining a service life of the clutch, there is suggested a method of reducing a relative rotational speed of the clutch engaged at a shifting time and applying the hydraulic pressure. For example, there is a method described in Unexamined Japanese PCT Publication No. 9-509237. In accordance with the publication, it is structured such as to calculate a desired engine rotational speed corresponding to a desired transmission input shaft rotational speed so that the relative rotational speed becomes smaller than a predetermined set value and control the engine rotational speed so that a difference between the desired engine rotational speed and an actual engine rotational speed becomes 0. Further, a control of the engine rotational speed is started at a time when the hydraulic pressure of the clutch starts up after the shift operation which is started at a fixed time after the shift operation is determined, and is maintained for a control maintaining time which is adjusted by learning a data obtained by measuring the transmission input and output shaft rotational speed at every shift operation. Further, in the publication, it is supposed that a finish time of the maintaining time coincides with a finish time of the clutch engagement after the shift operation by learning the control maintaining time.

However, there are the following problems in the technique mentioned above.

The time of controlling the engine is an average time which is learned under respective travel conditions, and is a fixed time. Accordingly, in an actual work field in which an incline of a travel path, a loading amount and a road condition always change, the result of the learning can not sufficiently achieve an intended control function. Further, in the case that the work field is changed, a shift control performance is not sufficient and a shift operability is not good until learning the respective work field and being applied thereto.

Here, FIG. 9 shows an example of a typical change in point of time of a clutch hydraulic pressure Pc in an automatic shift control apparatus of a work vehicle. A description will be given of a clutch engagement time in the case of a maximum loading time and an empty loading time. When setting a time t when starting the shift operation to 0, a hydraulic pressure (not shown) of the clutch before the shift operation corresponding to the speed stage before the shift operation is set to 0 when the shift operation is determined at a time when the time t is 0. Further, the oil starts being supplied to the clutch after the shift operation corresponding to the speed stage after the shift operation from the 0 time of the time t, and a filling time Tf is required before the clutch chamber is filled with the oil. After being filled with the oil, the clutch hydraulic pressure stands up at a predetermined incline and is increased to a predetermined maximum hydraulic pressure Pm. The predetermined incline is within a range of a time before the clutch is engaged after the shift operation, that is, a time range that a time Tt for which the clutch slips after the shift operation can secure a durability of the clutch, and is determined so that a small shift shock can be obtained, with taking into consideration a heavy load condition at a time of a maximum loading, traveling on a steep slope, traveling on a muddy road or the like.

However, in the predetermined incline of the clutch hydraulic pressure determined in this manner, there is the following problem. In general, when a vehicle body load which expresses a load to the clutch is small, for example, at an empty load time, the clutch is engaged in accordance with a small hydraulic pressure. Accordingly, since a start incline of the clutch hydraulic pressure is too large when the vehicle body load is small, a time Tk for which the clutch slips after the shift operation is smaller than the time Tt for which the clutch slips after the shift operation at the maximum loading time and the clutch is engaged for a short time. Accordingly, a rotational change of the output shaft of the transmission per a time is increased, and a shift shock is large. Further, since a time for which the shift operation is completed is not fixed due to a load change such as a weight of a load, an incline of a travel road and the like, a shift operability is not good.

Further, in accordance with the automatic shift control apparatus of the working vehicle, even in a state of pedaling the accelerator pedal (hereinafter, a shift operation in a state of pedaling the accelerator pedal is called as a power-on shift), in the case of shifting when the vehicle moves from a flat road to an ascending road having a large incline, a vehicle speed is suddenly reduced due to an insufficient traction force, so that there is a case that the shift operation is too late for the reduction of the vehicle speed when the shift operation is performed one step by one step until the speed stage capable of traveling is obtained. That is, since the time required for the shift operation, for example, 0.5 to 1 second is required for one shift operation, there is a case that a lot of time is required until being switched to the speed stage suitable to the necessary traction force when the incline is large and the vehicle speed is largely reduced, so that the vehicle speed is reduced too much during the time. In this case, even in the incline at which the vehicle can travel, for example, at a forward second speed (hereinafter, refer to as F2, for example, a forward first speed is called as F1), there occurs a kind of hunting that the speed stage is temporarily shifted down to F1 and thereafter again shifted up to F2, and the shock at the shifting time tends to be increased. Some times of shift operations apply an uncomfortable feeling and a fatigue feeling to the operator. Then, there has been conventionally employed a mechanism in which the operator manually operates a shift lever when entering to the ascending road, thereby shifting to a target speed stage without passing through the middle speed stage.

However, in the working vehicle which travels on a predetermined course, for example, the dump truck, there is the following problem. When the working vehicle comes to a predetermined place in the course, a manual shift operation by the operator is required every time. Accordingly, the operator is forced to perform a lot of duty.

Further, in the automatic shift control apparatus of the working vehicle, when stepping down the brake pedal during the travel at a certain speed stage so as to intend to stop, in the case that the speed reduction is largely performed by the brake, the down shift operation one step by one step to the speed stage of the low vehicle speed is too late for the reduction of the vehicle speed, so that next shift operation starts immediately after one shift operation is completed. At this time, some times of shift operations are continuously repeated for a short time, thereby applying a uncomfortable feeling to the operator.

Accordingly, there is proposed a lot of techniques which reduces the number of the shift operation repeated at a time of operating the brake, thereby applying no uncomfortable feeling to the operator, for example, there is known a technique described in Unexamined Japanese Utility Model Publication No. 57-149348. In the publication, there is disclosed a technique of reducing the number of the shift operation without shifting during the stepping of the brake pedal, thereby obtaining a comfortable operability.

However, in the technique mentioned above, there is the following problem.

In the case that the vehicle speed is reduced to a level corresponding to the speed state of the low speed among a plurality of speed stages when stepping down the brake pedal and releasing the brake pedal, the shift operation is repeated one step by one step to the speed stage of the low speed and the operator feels uncomfortable. Further, since the shift operation is not performed during the brake pedal is stepped down, the vehicle speed is reduced when the brake pedal is stepped down for a long time. At the same time, since the engine output shaft is directly connected to the transmission output shaft at a predetermined speed stage, the engine rotational speed is also reduced. A working fluid, a cooling water and the like which are used in the vehicle body are cooled by a fan driven by the engine, however, in this state, it is impossible to obtain a sufficient cooling efficiency since the engine rotational speed is small.

SUMMARY OF THE INVENTION

The present invention is made by taking the problems mentioned above into consideration, and an object of the present invention is to provide a shift control apparatus of a working vehicle in which an excellent shift operability can be obtained without reference to an incline of a travelling road, a loading amount and a road condition without necessity of learning a time for controlling an engine.

Further, an object of the present invention is to provide a shift control apparatus of a working vehicle having a reduced shift shock and a shift operability with a good operation feeling having a substantially fixed shift time without reference to a magnitude of a vehicle body load.

Further, an object of the present invention is to provide a shift control apparatus of a working vehicle having a good operability and a small shift shock, in which a manual shift operation is not required by an operator at a time of a power on shift down together with a sudden reduction of a vehicle speed such as at a time of entering to an ascent road from a flat road.

In addition, an object of the present invention is to provide a shift control apparatus of a working vehicle in which a shift operation can be performed to a speed stage corresponding to a vehicle speed at a time of releasing a brake pedal without passing through the other speed stage, thereby reducing a number of the shift operation and obtaining a comfortable driving operability, and a sufficient cooling efficiency can be obtained even when stepping down the brake pedal for a long time.

In order to achieve the objects mentioned above, in accordance with a first aspect of the present invention, there is provided a shift control apparatus of a working vehicle having: an accelerator pedal operating amount detector; a controller which outputs a fuel injection amount command signal on the basis of an accelerator operating amount; a fuel injecting apparatus which injects a fuel on the basis of the fuel injection amount command signal; an engine having a rotational speed which is controlled in accordance with a fuel injected by the fuel injection apparatus; a transmission which changes an output rotational speed of the engine in correspondence to a speed stage in accordance with an engagement and a disengagement of a plurality of hydraulic clutches and a combination of a plurality of gears; a transmission output shaft rotational speed detector; an electromagnetic proportional control valve which supplies a predetermined hydraulic pressure to each of hydraulic clutches in correspondence to the speed stage of the transmission; and automatic shift control means which determines the speed stage in accordance with a shift graph set on the basis of the acceleration pedal operating amount and the transmission output shaft rotational speed and outputs a command signal to the electromagnetic proportional control valve in correspondence to the speed stage so as to shift, wherein a transmission input shaft rotational speed detector is provided, the transmission input shaft rotational speed signal and the transmission output shaft rotational speed signal are input to the controller, and the controller outputs a command for setting a hydraulic pressure of a clutch before a shift operation to 0 value at a time of starting the shift operation and a command for making a hydraulic pressure of a clutch after the shift operation be gradually increased in point of time to the electromagnetic proportional control valve, changes the fuel injection amount command signal to the fuel injection apparatus from the accelerator injection amount signal on the basis of the accelerator pedal operating amount to a synchronous injection amount signal for controlling the engine rotational speed so that an absolute value of an input shaft conversion relative speed corresponding to a difference between an input transmission input shaft rotational speed and an input shaft conversion rotational speed in a speed stage after the shift operation of an input transmission output shaft rotational speed is reduced, and changes the fuel injection amount command signal from the synchronous injection amount signal to the accelerator injection amount signal when the absolute value of the input shaft conversion relative speed becomes smaller than a predetermined threshold.

In accordance with the invention stated in the first aspect, when the controller judges that the speed stage is changed, the command for setting the hydraulic pressure of the clutch before the shift operation to 0 value is output to the electromagnetic valve via the electromagnetic valve command output portion of the automatic shift control means. Accordingly, all the clutches within the transmission are in a disengaged state. At the same time, the fuel injection amount command signal to the fuel injection apparatus of the engine is changed from the accelerator injection amount signal on the basis of the accelerator pedal operation amount to the synchronous injection amount signal for controlling the engine rotational speed so that the absolute value of the input shaft conversion relative speed becomes smaller than the predetermined threshold value.

In accordance with the synchronous injection amount, in the case of an up shift, the fuel injection amount is reduced and the engine rotational speed is reduced, and in the case of a down shift, the injection amount is increased and the engine rotational speed is increased. Thereafter, the accelerator injection signal is output to the fuel injection apparatus after the input shaft conversion relative speed becomes smaller than the threshold value, and the general vehicle speed operation is performed by the operator. The inertia torque caused by the rotational accelerator at a time of engagement is reduced by controlling the engine rotational speed and reducing the input shaft conversion relative speed, and a shift shock is reduced. In addition, since the fuel injection amount to the engine is reduced when the up shift is performed, the engine output torque is also reduced, so that in comparison with the case that the engine rotational speed is not controlled, the engagement of the clutch after the shift operation is completed by a smaller clutch hydraulic pressure. Accordingly, since an incline of the clutch hydraulic pressure in point of time can be set to be smaller in comparison with the time when the engine rotational speed is not controlled, it is possible to further reduce a shift shock. Further, since the rotational speed of the engine is controlled after it is judged that the speed stage is changed before the input shaft conversion relative speed becomes smaller than the threshold, that is, until the relative rotational speed of the clutch becomes a securely small state, it is possible to always obtain a stable shift operability having a small shock without reference to a magnitude of the incline of the travel road or a magnitude of the loading amount.

In accordance with a second aspect of the present invention, there is provided a shift control apparatus of a working vehicle having: a transmission which shifts in correspondence to a speed stage in accordance with an engagement and a disengagement of a plurality of hydraulic clutches and a combination of a plurality of gears; an accelerator pedal detector which detects an accelerator pedal operation amount of an operator; a transmission output shaft rotational speed detector which detects a rotational speed of an output shaft of the transmission; an electromagnetic proportional control valve which supplies a predetermined hydraulic pressure to each of hydraulic clutches in correspondence to the speed stage of the transmission; a transmission controller which has a speed stage judging portion for determining the speed stage in accordance with a shift graph set on the basis of the acceleration pedal operating amount and the transmission output shaft rotational speed and outputting a command signal of a clutch hydraulic pressure standup incline with a fixed incline value in correspondence to the determined speed stage, and has an electromagnetic valve signal output portion for driving the electromagnetic proportional control valve in accordance with an input of a command signal; wherein an engine output torque calculating portion which calculates an engine output shaft torque on the basis of the accelerator pedal operation amount is provided, and the transmission controller is provided with a modulation control portion which detects a vehicle body load, sets the clutch hydraulic pressure standup incline of the command signal output to the electromagnetic proportional control valve in accordance with a magnitude of the detected vehicle body load so that an engagement time between the clutch hydraulic pressure of the clutch after the shift operation determined on the basis of the shift graph in the speed stage judging portion standing up and the engagement being completed becomes substantially uniform, and outputs the command signal on the basis of the set incline to the electromagnetic proportional control valve via an electromagnetic valve signal output portion.

In accordance with the invention stated in the second aspect, since the hydraulic pressure stands up in accordance with the standup incline of the clutch hydraulic pressure set so that the engagement time is substantially uniform in correspondence to the magnitude of the vehicle body load even when the vehicle body load is changed, the clutch is always engaged at a uniform engagement time. Accordingly, since the clutch is not engaged for a short time even when the vehicle body load is small, it is possible to obtain the shift control apparatus having a small shift shock without reference to the magnitude of the vehicle body load.

In accordance with a third aspect of the present invention, there is provided a shift control apparatus of a working vehicle as stated in the second aspect, wherein a transmission input shaft rotational speed detector for detecting an input shaft rotational speed of the transmission is provided, and the modulation control portion is structured such as to output a command of changing the standup incline of the clutch hydraulic pressure to a predetermined incline greater than the standup incline set at a time of starting the shift operation when an absolute value of a difference between the transmission input shaft rotational speed and the input shaft conversion rotational speed in the speed stage after the shift operation of the transmission output shaft rotational speed becomes smaller than a predetermined threshold during standing up the hydraulic pressure of the clutch corresponding to the speed stage after the shift operation, to the electromagnetic proportional control valve via the electromagnetic valve signal output portion.

In accordance with the invention stated in the third aspect, when it is judged that the absolute value of the difference between the transmission input shaft rotational speed and the input shaft conversion rotational speed in the speed stage after the shift operation of the transmission output shaft rotational speed is smaller than the predetermined input shaft conversion relative speed threshold, it is supposed that the engagement of the clutch is completed, the incline is changed from the currently set incline to the predetermined larger incline, the clutch hydraulic pressure is suddenly increased, and the clutch hydraulic pressure reaches a predetermined maximum hydraulic pressure, whereby the shift operation is completely finished. The time after the clutch completes the engagement and before reaching the predetermined hydraulic pressure is substantially uniform without reference to the magnitude of the vehicle body load since the predetermined hydraulic pressure standup incline is sufficiently great. In general, the time necessary for filling the clutch chamber with the oil after the shift operation is started and before the clutch hydraulic pressure starts standing up is substantially equal to each other in the respective clutches. Further, in accordance with the first aspect, since the time after the clutch hydraulic pressure starts standing up and before the clutch completes the engagement is substantially uniform, the time after the shift operation is started and before the shift operation is completely finished becomes substantially uniform, so that it is possible to always obtain a substantially uniform shifting time without reference to the magnitude of the vehicle body load. Accordingly, it is possible to obtain the shift control apparatus having a good operation feeling.

In accordance with a fourth aspect of the present invention, there is provided a shift control apparatus of a working vehicle having: a transmission which shifts in correspondence to a speed stage in accordance with an engagement and a disengagement of a plurality of hydraulic clutches and a combination of a plurality of gears; an accelerator pedal operation amount detector which detects an accelerator pedal operation amount of an operator; a transmission output shaft rotational speed detector which detects a rotational speed of an output shaft of the transmission; an electromagnetic proportional control valve which supplies a predetermined hydraulic pressure to each of hydraulic clutches in correspondence to the speed stage of the transmission; and a transmission controller which determines the speed stage after the shift operation in accordance with a shift graph set on the basis of the acceleration pedal operating amount and the transmission output shaft rotational speed and outputs a command signal of a clutch hydraulic pressure in correspondence to the determined speed stage after the shift operation to the electromagnetic proportional control valve so as to shift, wherein a transmission input shaft rotational speed detector for detecting the input shaft rotational speed of the transmission is provided, and the transmission controller is structured such as to output a command of setting the hydraulic pressure of the clutch before the shift operation corresponding to the speed stage before the shift operation to 0 value to the electromagnetic proportional control valve at a time of starting the shift operation when the shift operation to the low speed stage is performed in a state that the accelerator pedal is stepped down and further output a command of standing up the hydraulic pressure of the clutch after the shift operation corresponding to the speed stage after the shift operation to the electromagnetic proportional control valve when an absolute value of the input shaft conversion relative speed obtained by subtracting the input shaft conversion rotational speed in the speed stage after the shift operation of the transmission output shaft rotational speed from the transmission input shaft rotational speed is smaller than a predetermined small speed threshold so as to shift.

In accordance with the invention stated in the fourth aspect, when the shift start is determined, the hydraulic pressure of the clutch before the shift operation is set to 0 value and all the clutches which set the speed stage of the transmission are in a state of being disengaged. At a time of a shift down when entering to the ascending road, the vehicle speed, that is, the transmission output shaft rotational speed is reduced. Further, since the operator steps down the accelerator pedal at this time, the engine output rotational speed, that is, the transmission input shaft rotational speed is increased. When the input shaft conversion relative speed changes from a negative value to a positive value, that is, the relative rotational speed of the clutch is within the predetermined threshold close to 0 value, the clutch hydraulic pressure of the clutch after the shift operation corresponding to the speed stage after the shift operation is stood up. Accordingly, since the clutch is engaged when the relative rotational speed of the clutch is small, it is possible to obtain the shift control apparatus having a small shift shock and not affected by the engine brake or the like.

In accordance with the invention stated in a fifth aspect, there is provided a shift control apparatus of a working vehicle as stated in the fourth aspect, wherein the transmission controller can perform a jump shift in which the speed stage is changed from the current speed stage to the speed stage after the shift operation without passing through the middle speed stage, and is structured such as to perform the jump shift when the vehicle acceleration calculated on the basis of the transmission output shaft rotational speed is smaller than a predetermined acceleration threshold and perform the shift operation one step by one step in accordance with a normal manner when it is equal to or more than the acceleration threshold.

In accordance with the invention stated in the fifth aspect, when the shift start is determined, the vehicle acceleration is calculated by differentiating the transmission output shaft rotational speed at a time of starting the shift operation in point of time, it is judged whether or not the calculated vehicle acceleration is smaller than the predetermined acceleration threshold value and it is determined whether or not the jump shift is performed. It is possible to reflect the change of the vehicle speed in point of time to the determination of the speed stage, and when the vehicle speed is largely changed in point of time, the shift operation is performed by the jump shift. Accordingly, it is possible to obtain the shift control apparatus in which the number of the shift operation is reduced and the operator does not feel uncomfortable. Further, it is not necessary for the operator to manually operate the shift lever in a jumping manner, so that it is possible to obtain the shift control apparatus having an excellent operability.

In accordance with the invention stated in a sixth aspect, there is provided a shift control apparatus of a working vehicle as stated in the fourth aspect, wherein a vehicle weight detector which detects a weight of the vehicle or an acceleration detector for detecting an acceleration of the vehicle in a forward moving direction is provided, an engine controller which calculates an engine output torque on the basis of an accelerator pedal operation amount and outputs the calculated engine output torque to the transmission controller is provided, and the transmission controller can perform a jump shift in which the speed stage is changed from the current speed stage to the speed stage after the shift operation without passing through the middle speed stage, and is structured such as to determine the speed stage after the shift operation on the basis of an input engine output torque, a vehicle acceleration calculated on the basis of the transmission output shaft rotational speed and a required traction force calculated on the basis of the vehicle weight detected by the vehicle weight detector or the vehicle acceleration detected by the acceleration detector, perform a jump shift when the determined speed stage after the shift operation is not adjacent to the current speed stage, and perform the shift operation one state by one stage when it is adjacent thereto.

In accordance with the invention stated in the sixth aspect, the necessary traction force required for traveling at a fixed vehicle speed is calculated on the basis of the vehicle weight detected by the vehicle weight detector or the vehicle acceleration detected by the acceleration detector for detecting the acceleration in the forward moving direction of the vehicle, the vehicle propelling force determined on the basis of the engine output torque calculated in the engine output torque calculating portion, and the acceleration in the vehicle forward moving direction calculated by the controller. The speed stage capable of traveling is determined in accordance with the calculated necessary traction force and a vehicle speed—traction force curve previously stored in the controller. When the determined speed stage is not adjacent to the current speed stage, the shift operation is performed in a jump manner without passing through the middle speed stage. Accordingly, the number of the shift operation can be reduced, it is not necessary for the operator to manually operate the shift lever in a jump manner, and it is possible to obtain the shift control apparatus having an excellent operability. Further, since the state amount which changes in point of time such as the vehicle propelling force and the vehicle acceleration and the vehicle weight which can judge the loading state can be finely reflected to the determination of the next speed stage, it is possible to obtain the shift control apparatus which corresponds to the operation feeling of the operator.

In accordance with the invention stated in a seventh aspect, there is provided a shift control apparatus of a working vehicle having: a transmission which shifts in correspondence to a speed stage in accordance with an engagement and a disengagement of a plurality of hydraulic clutches and a combination of a plurality of gears; an accelerator pedal operation amount detector; a transmission output shaft rotational speed detector; an electromagnetic proportional control valve which supplies a predetermined hydraulic pressure to each of hydraulic clutches in correspondence to the speed stage of the transmission; and a transmission controller which determines the speed stage in accordance with a shift graph set on the basis of the acceleration pedal operating amount and the transmission output shaft rotational speed and outputs a command signal to the electromagnetic proportional control valve in correspondence to the determined speed stage so as to shift the transmission, wherein the improvement comprises: a brake pedal operation detector which detects an operation of the brake pedal and outputs a brake operation signal; and braking time shift control means which keeps the speed stage at a time when the brake operation signal is turned on and shifts the speed stage from the speed stage at the on time to the speed stage corresponding to the transmission output shaft rotational speed at a time when the brake is turned off when the brake operation signal is turned off from the on state without passing through the other speed stage.

In accordance with the invention stated in the seventh aspect, since the shift operation is not performed during the brake pedal is stepped down and is performed so that the speed stage is changed to a new speed stage corresponding to the transmission output shaft rotational speed at a time of releasing the brake pedal without passing through the other speed stage when the brake pedal is released, the shift operation is not continuously repeated and the number of the shift operation is reduced, so that it is possible to obtain the shift control apparatus having a good operability.

In accordance with the invention stated in an eighth aspect, there is provided a shift control apparatus of a working vehicle as stated in the seventh aspect, wherein the braking time shift control means is further structured such as to keep the speed stage at a time when the brake operation signal is turned on until a predetermined time after the brake operation signal is turned on, and shift to the speed stage corresponding to the transmission output shaft rotational speed at a time when the predetermined time has passed without passing through the other speed stage.

In accordance with the invention stated in the eighth aspect, when the time of stepping down the brake pedal does not reach the predetermined time, the current speed stage is continuously kept. Accordingly, since the shift operation is not performed for a short time and the number of the shift operation is reduced, the operator does not feel uncomfortable. Further, when stepping the brake and the predetermined time has passed, the speed stage is changed from the speed stage at a time of starting stepping down the brake pedal to the speed stage corresponding to the transmission output shaft rotational speed at a time when the predetermined time has passed. Accordingly, since the reduced engine rotational speed is recovered by the shift operation, it is possible to secure a predetermined cooling efficiency of a working fluid and a cooling water.

In accordance with the invention stated in a ninth aspect, there is provided a shift control apparatus of a working vehicle as stated in the seventh aspect, wherein the braking time shift control means is further structured such as to shift from the speed stage at a time when the brake operation signal is turned on to the starting speed stage without passing through the other speed stage, when the transmission output shaft rotational speed becomes smaller than a predetermined rotational speed set for the purpose of shifting to a predetermined starting speed stage used at a time of starting the vehicle, during the predetermined time has passed after the brake operation signal is turned on.

In accordance with the invention stated in the ninth aspect, when the transmission output shaft rotational speed becomes smaller than the predetermined rotational speed set so as to shift to the starting speed stage during the time of stepping the brake pedal has passed for the predetermined time, the speed stage is changed from the speed stage at a time of starting stepping down the brake pedal to the starting speed stage without passing through the other speed stage. Accordingly, since the speed stage at the next starting time is quickly prepared in addition to the effect of the seventh aspect, it is possible to obtain the shift control apparatus having a good operability.

DETAILED DESCRIPTION OF THE PREFERRED EMBODIMENTS

A description will be given of a first embodiment in accordance with a shift control apparatus of a working vehicle of the present invention with reference to the accompanying drawings.

Figure 1:
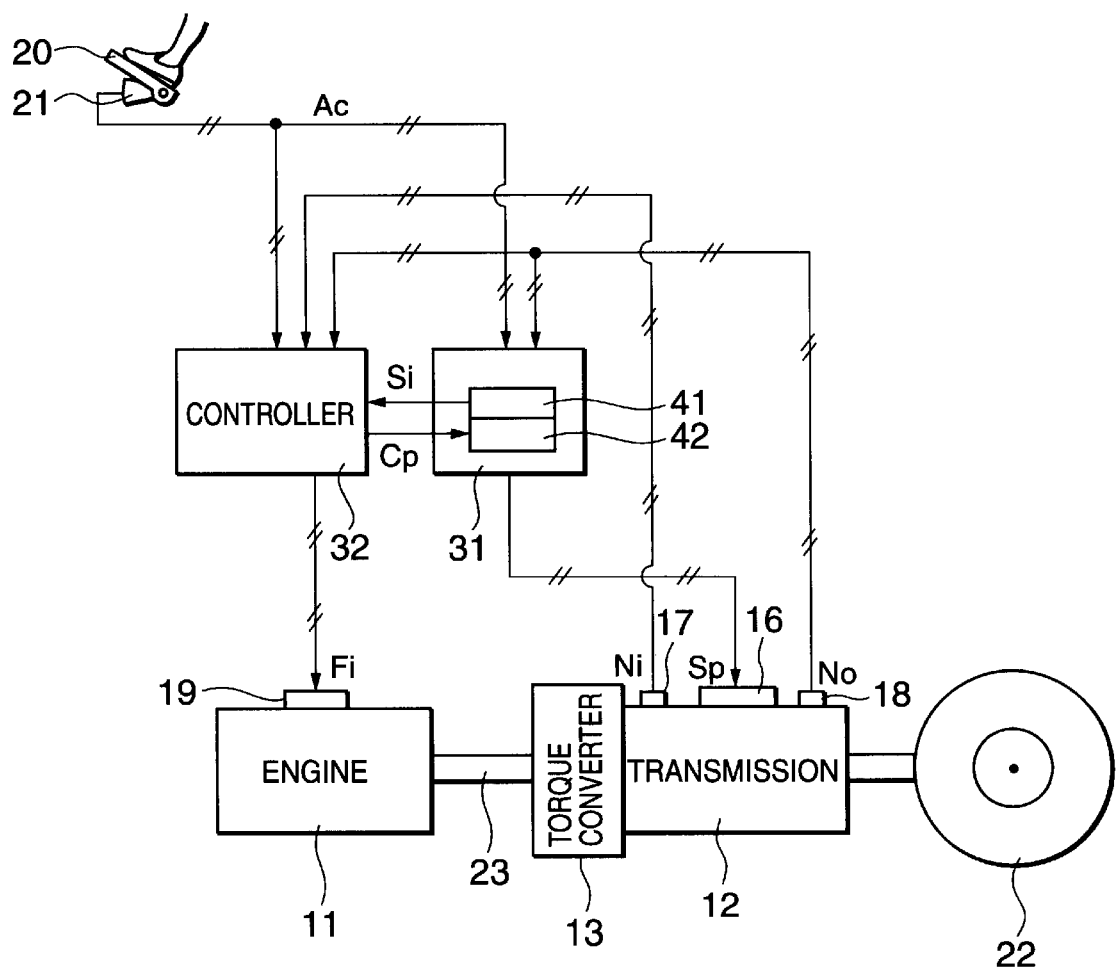
FIG. 1 is a schematic view of a hardware structure of a first embodiment in accordance with a shift control apparatus of a working vehicle of the present invention.

A hardware structure is shown in FIG. 1. A transmission 12 which engages or disengages a plurality of clutches by turning on and off a clutch hydraulic pressure so as to select a speed stage is mounted to an output shaft 23 of an engine 11 via a torque converter 13. A rear tire wheel 22 corresponding to a drive wheel is mounted to an output shaft of the transmission 12. An electromagnetic proportional control valve 16 which supplies a predetermined hydraulic pressure to a plurality of clutches for selecting the speed stage (hereinafter, the electromagnetic proportional control valve in each of the clutches is wholly called as an electromagnetic valve 16) is mounted to a predetermined place of the transmission 12. Further, a fuel injection apparatus 19 which controls in accordance with an electric signal for setting a fuel injection amount to each of cylinders of the engine 11 is mounted to a predetermined place of the engine 11. An accelerator pedal 20 which an operator actuates is provided close to the operator's feet.

As a detector, a transmission input shaft rotational speed detector 17 (hereinafter, refer to as an input speed detector 17) which measures a transmission input shaft rotational speed Ni (hereinafter, refer to as an input speed Ni) is mounted close to a periphery of the transmission input shaft, and a transmission output shaft rotational speed detector 18 (hereinafter, refer to as an output speed detector 18) which measures a transmission output shaft rotational speed No (hereinafter, refer to as an output speed No) is mounted close to a periphery of the transmission output shaft. Further, an accelerator pedal operation amount detector 21 which detects an accelerator pedal operation amount Ac is provided in a lower portion of the accelerator pedal 20.

Conventional automatic shift control means 31 is constituted by a speed stage judging portion 41 which determines in accordance with a shift graph on the basis of the accelerator pedal operation amount Ac and the output speed No, and an electromagnetic valve signal output portion 42 which outputs an electromagnetic valve signal Sp for controlling a change in point of time of the hydraulic pressure before the shift operation and the hydraulic pressure after the shift operation.

The accelerator pedal operation amount Ac and the output speed No are input to the speed stage judging portion 41 via an input circuit (not shown). Further, a shift determination signal Si which judges whether or not the shift operation is performed is output from the speed stage judging portion 41 to a controller 32 which controls the engine rotational speed at a time of shifting. A hydraulic pressure timing command Cp which commands a standing down timing of the clutch hydraulic pressure before the shift operation and a changing timing of an incline in point of time of the clutch hydraulic pressure after the shift operation is input to the electromagnetic valve signal output portion 42. Further, an electromagnetic valve signal Sp is output from the electromagnetic valve signal output portion 42 to the electromagnetic valve 16 via an output drive portion (not shown).

The accelerator pedal operation amount Ac, the input speed Ni and the output speed No are input to the controller 32 via an input circuit (not shown). Further, the hydraulic pressure timing command Cp is output from the controller 32 to the electromagnetic valve signal output portion 42, and a fuel injection amount command signal Fi is output to the fuel injection apparatus 19 via an output drive portion (not shown).

Figure 2:
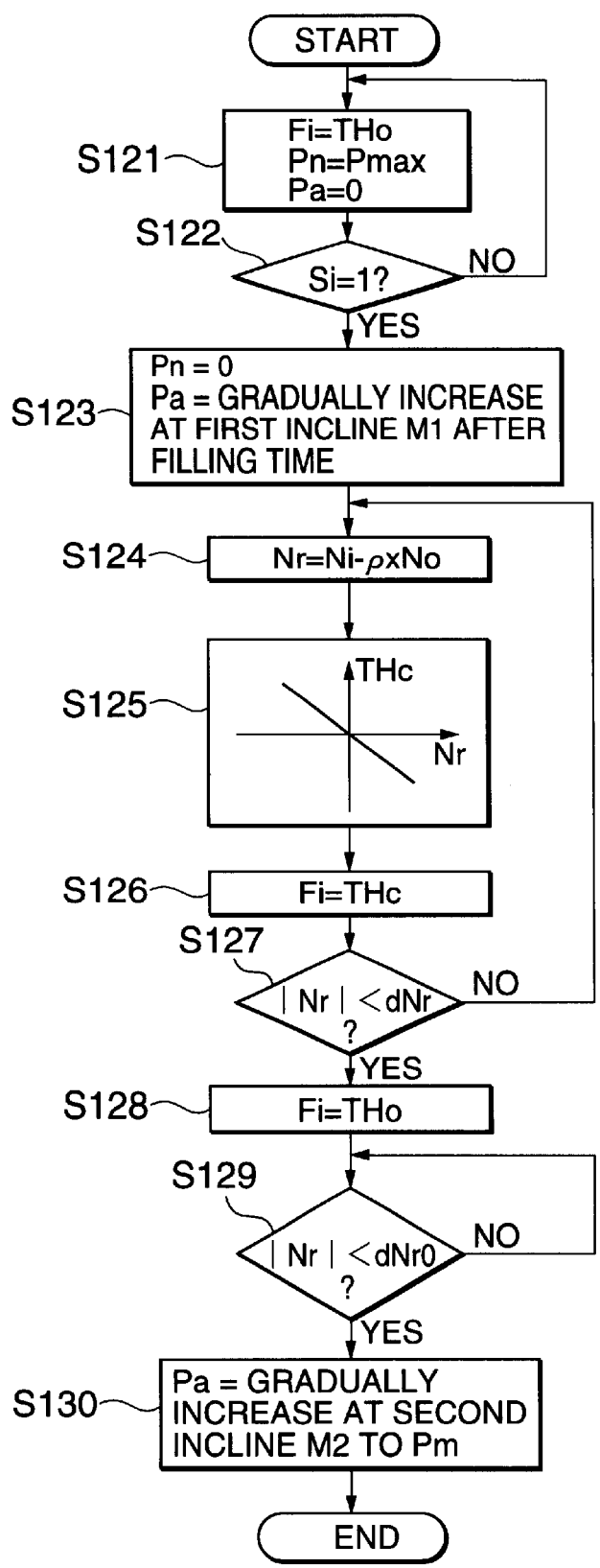
FIG. 2 is a control flow chart of a controller shown in FIG. 1.
Figure 3:
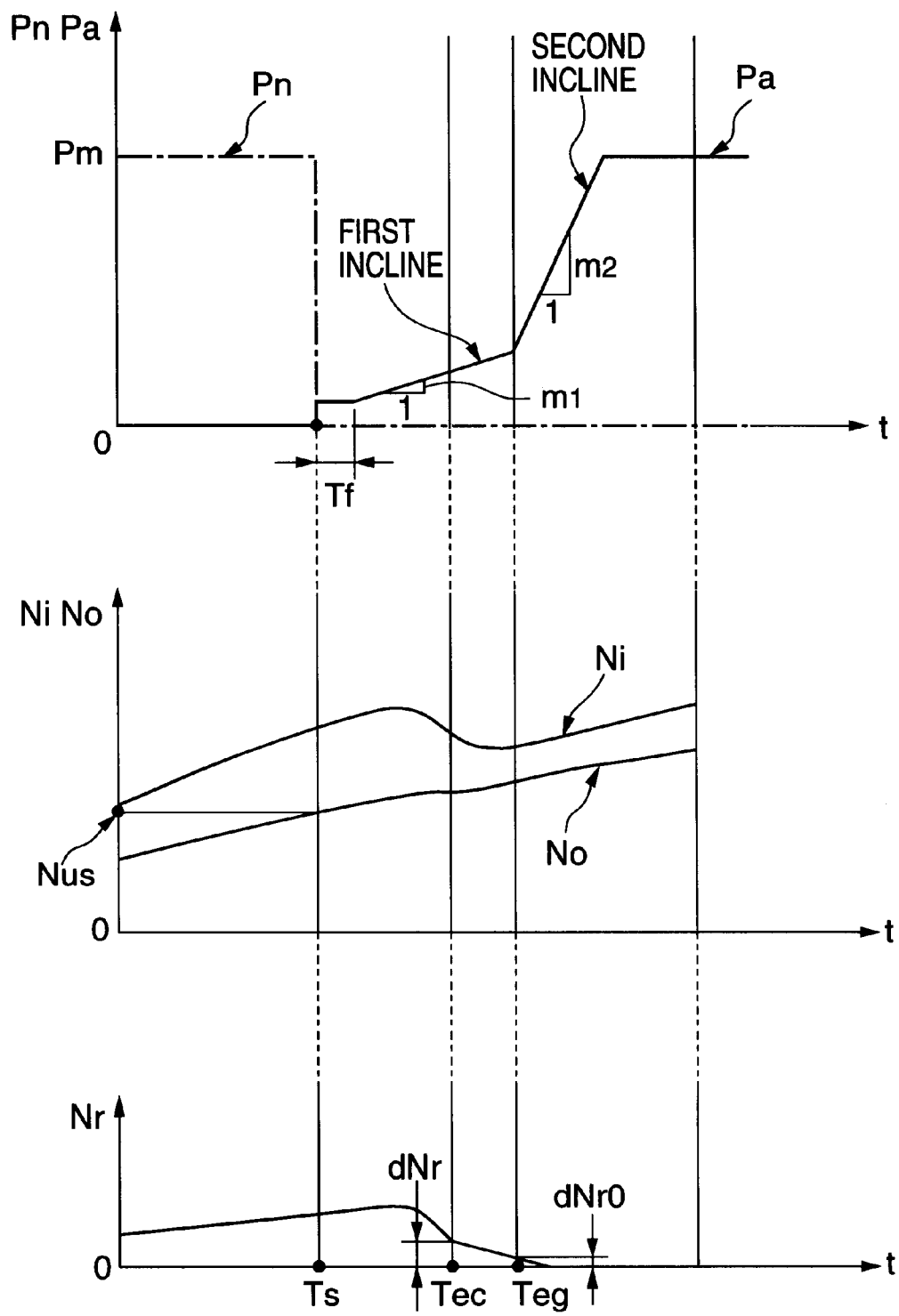
FIG. 3 is a schematic view of a change in point of time of each of state amounts at an up shift time.
Figure 4:
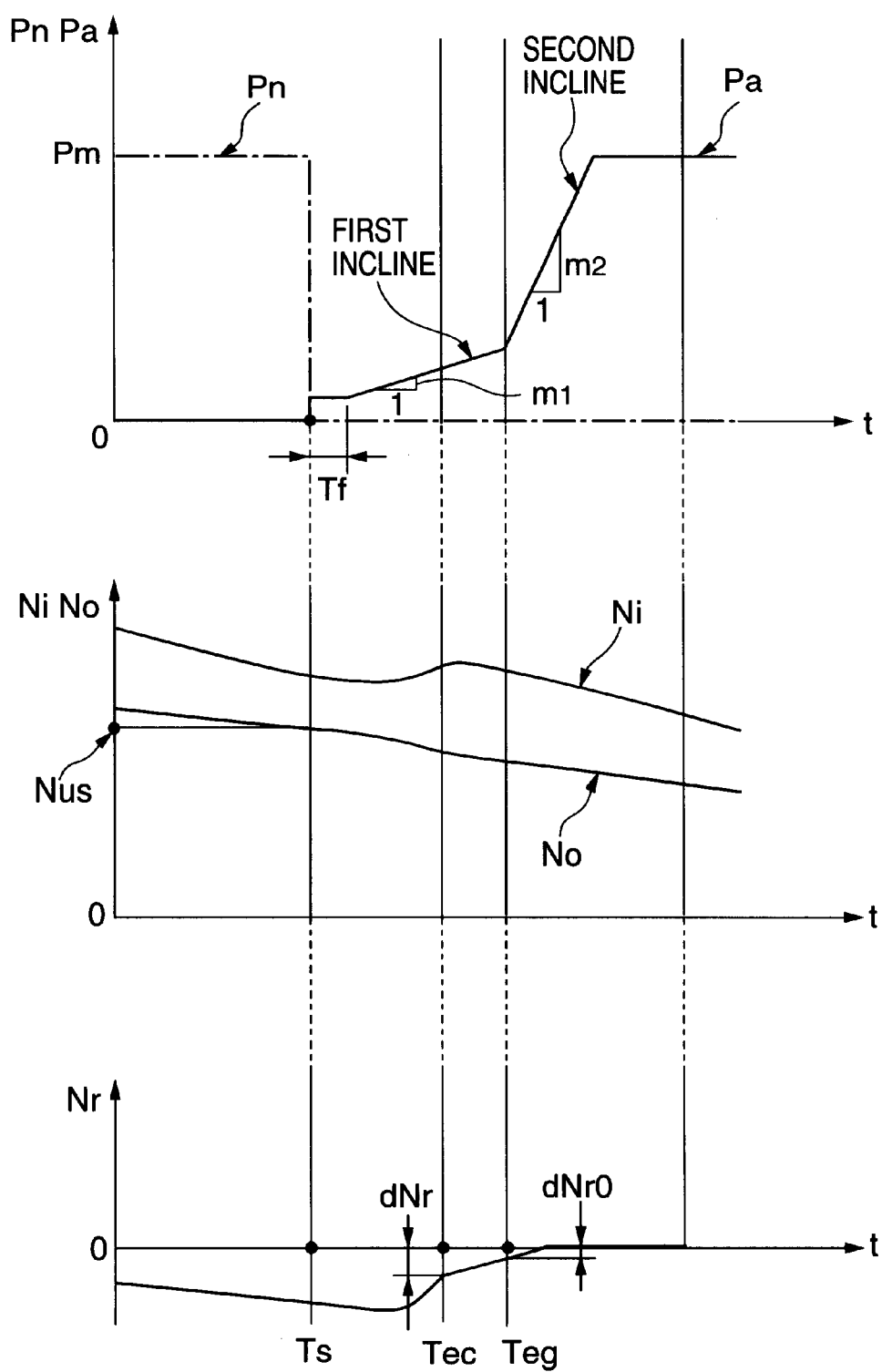
FIG. 4 is a schematic view of a change in point of time of each of state amounts at a down shift time.

A control flow chart of the controller 32 is shown in FIG. 2. FIG. 3 shows a change of each of a clutch hydraulic pressure before the shift operation Pn, a clutch hydraulic pressure after the shift operation Pa, an input speed Ni, an output speed No, and a transmission input and output relative rotational speed Nr of a speed stage after the shift operation Nr (hereinafter, refer to as an input shaft conversion relative speed Nr) corresponding to a value obtained by subtracting an input shaft conversion rotational speed in the speed stage after the shift operation at the output speed No from the input speed Ni, at an up shift time. Further, FIG. 4 shows a change in point of time of the same state amounts as those shown in FIG. 3, at a down shift time. A processing operation of the present embodiment will be described with reference to these drawings. In this case, in the description in FIG. 2, a reference symbol S is attached to a step number of each of the processes.

Before shifting, the clutch hydraulic pressure Pn before the shift operation which expresses a hydraulic pressure of the clutch engaged until the shift operation is determined is set to a predetermined maximum hydraulic pressure Pm, and the clutch hydraulic pressure Pa after the shift operation which expresses a hydraulic pressure of the clutch corresponding to a determined new speed stage is set to 0 value. A fuel injection amount command signal Fi to the fuel injection apparatus 19 is set to a value of an accelerator injection amount signal THo on the basis of the accelerator pedal operation amount Ac (S121).

It is judged by the speed stage judging portion 41 of the automatic shift control means 31 to be an up shift when the output speed No is greater than a predetermined up shift judging standard rotational speed Nus and to be a down shift when it is smaller than a predetermined down shift judging standard rotational speed Nds. The shift determination signal Si is output to the controller 32 so as to be "1" when the shift operation is determined on the basis of the judging result and "0" when it is not determined. The controller 32 judges whether the shift determination signal Si is "1" or "0" (S122). When it is "0", the step goes back to the process of S121, and waits until the shift determination signal Si changes to "1". When it judges "1", the clutch hydraulic pressure Pn before the shift operation is set to 0 value, the hydraulic timing command Cp for standing up the clutch hydraulic pressure Pa after the shift operation is output to the electromagnetic valve signal output portion 42 (S123), and the electromagnetic valve signal Sp is output from the electromagnetic signal output portion 42 to the electromagnetic valve 16. This time is set to a shift starting time Ts shown in FIGS. 3 and 4. The clutch hydraulic pressure Pa after the shift operation starts standing up at a first incline M1 having a predetermined incline m1 in point of view after a filling time Tf which expresses a time until the clutch chamber is filled with the oil after the shift operation has passed. At the same time, an input shaft conversion relative speed Nr expressed by an formula "Ni−ρ×No" when a speed reduction ratio of the speed stage after the shift operation is calculated (S124).

A synchronous injection amount signal THc is calculated so as to reduce the fuel injection amount in correspondence to a magnitude of the input shaft conversion relative speed Nr when the value Nr is positive and to increase the fuel injection amount in correspondence to the magnitude of the value Nr when the value Nr is negative (S125). The fuel injection amount command signal Fi to the fuel injection apparatus 19 is set to the synchronous injection amount signal THc and the engine rotational speed control is started (S126).

Thereafter, it is judged whether or not an absolute value of the input shaft conversion relative speed Nr is smaller than a predetermined relative speed threshold dNr (S127). In this case, when it is equal to or more than the relative speed threshold dNr, the step goes back to the step S124, the process is repeated, and the engine rotational speed is subsequently controlled on the basis of the calculated synchronous injection amount signal THc. Thereafter, the time when the absolute value of the input shaft conversion relative speed Nr becomes smaller than the relative speed threshold dNr is set to an engine synchronization completing time Tec, the engine rotational speed control in accordance with the synchronous injection amount is finished, and the accelerator injection amount signal THo on the basis of a detecting signal Ac from the accelerator pedal operation amount detector 21 is commanded to the fuel injection amount 19 as the injection amount command signal Fi (S128). The relative speed threshold dNr is previously stored in the controller 32 in a shape of a map, and is set on the basis of the fuel injection amount, an accelerator opening degree and a response of the engine.

Next, it is judged whether or not the absolute value of the input shaft conversion relative speed Nr is smaller than an engagement judging relative speed threshold dNr0 (S129). When the input shaft conversion relative speed Nr is equal to or more than the engagement judging relative speed threshold dNr0, the process of the step S129 is repeated. When it is smaller, an incline of the clutch hydraulic pressure after the shift operation Pa is changed from a first incline M1 to a second incline M2 having a predetermined incline m2 in point of time (S130) to be gradually increased to a predetermined maximum hydraulic pressure Pm, and the process is completed. In this case, the engagement judging relative speed threshold dNr0 is a threshold for judging that the clutch after the shift operation completes the engagement, is smaller than the relative speed threshold dNr, and is a value after taking a measurement error into consideration, for example, is set to 30 rpm.

In accordance with the present embodiment, when the speed stage change is determined by the controller 32, the clutch hydraulic pressure before the shift operation Pn is set to 0 and the hydraulic pressure after the shift operation Pa is gradually increased after passing through a filling time. At the same time, the synchronous injection signal THc is output to the fuel injection apparatus 19 in place of the accelerator injection amount signal THo on the basis of the accelerator pedal operating amount Ac.

In accordance with the synchronous injection amount signal THc calculated on the basis of the input shaft conversion relative speed Nr, the fuel injection amount is reduced so as to reduce the engine rotational speed in the case of the up shift, and the injection amount is increased so as to increase the engine rotational speed in the case of the down shift, whereby the engine rotational speed is controlled until the input shaft conversion relative speed Nr becomes smaller than the predetermined relative speed threshold dNr. Accordingly, it is possible to restrict a generation of an inertia torque to a low level and always obtain a stable shift operability having a small shock without reference to a magnitude of the incline of the travelling road or a magnitude of the loading amount.

It is judged that an engagement of the clutch after the shift operation is completed when the input shaft conversion relative speed Nr becomes smaller than the engagement judging relative speed threshold dNr0, and the clutch hydraulic pressure after the shift operation changes the incline in point of time from the first incline M1 to the second incline M2 so as to gradually increase to the predetermined maximum hydraulic pressure Pm. Further, at this time, the engine rotational speed control in accordance with the synchronous injection amount signal is already stopped at the engine synchronous completing time Tec, however, an effect of the engine rotational speed control is maintained for a while due to a response of the engine. Accordingly, a shock is reduced by setting the relative speed threshold dNr to be greater than the engagement judging relative speed threshold dNr0 and setting the difference between the relative speed threshold dNr and the engagement judging relative speed threshold dNr0 by taking a response of the engine into consideration, and it is possible to an excellent shift operability having no slow feeling.

In the case of the down shift at a time of ascending, since the input shaft conversion relative speed Nr is reduced, it is intended to increase the engine rotational speed. In addition, the vehicle speed is suddenly reduced during a short time at which the hydraulic pressure is not applied to all the clutches, that is, since the engine output rotational speed becomes small, the input shaft conversion relative speed Nr quickly becomes smaller than the predetermined relative speed threshold dNr and the shift operation is quickly completed. Further, in the case of the up shift at a time of descending, it is in the state of intending to reduce the engine rotational speed. At this time, since the descending speed is increased during the hydraulic pressure is not applied to all the clutches due to the descending attitude, that is, the engine output rotational speed is increased, the input shaft conversion relative speed Nr becomes quickly smaller than the relative speed threshold dNr and the shift operation is quickly completed with no shock.

In the up shift at a time of ascending or the down shift at a time of descending, the engine rotational speed is controlled after the change of the speed stage is determined and before the input shaft conversion speed Nr becomes smaller than the predetermined relative speed threshold dNr. Accordingly, it is possible to always obtain a stable shift operability having a small shock without reference to a magnitude of the incline of the traveling road or a magnitude of the loading amount.

In this case, in accordance with the present embodiment, as the calculation of the fuel injection amount in the engine rotational speed control, the synchronous injection amount signal THc is calculated so as to reduce the fuel injection amount in correspondence to the magnitude of the input shaft conversion relative speed Nr when the value Nr is positive and to increase the fuel injection amount in accordance with the value Nr when the value Nr is negative, however, it is possible to make the structure such as to set a predetermined fixed value having a small fuel injection amount when the input shaft conversion relative speed Nr is positive and set a predetermined fixed value having a large fuel injection amount when it is negative.

As mentioned above, in accordance with the present invention, the input shaft conversion relative speed can be reduced and the generation of the inertia torque caused by the rotational acceleration of the inertia in the side of the transmission input can be restricted to a low level by reducing the fuel injection amount so as to reduce the engine rotational speed at a time of the up shift and increasing the fuel injection amount so as to increase the engine rotational speed at a time of the down shift. Accordingly, it is possible to always obtain a stable shift operability having a small shock without reference to the magnitude of the incline of the traveling road or the magnitude of the loading amount. Further, it is not necessary to learn the time for controlling the engine rotational speed. Further, the control is returned to the engine rotational speed control in accordance with the normal accelerator operation after the input shaft conversion relative speed becomes smaller than the relative speed threshold. Since the relative speed threshold is set by taking the response of the engine into consideration, it is possible to obtain a continuous shift operation feeling even when the rotational speed of the engine is switched from the control in accordance with the synchronous injection signal to the normal control in accordance with the accelerator operation.

Next, a description will be given of a second embodiment in accordance with the present invention with reference to the accompanying drawings.

Figure 5:
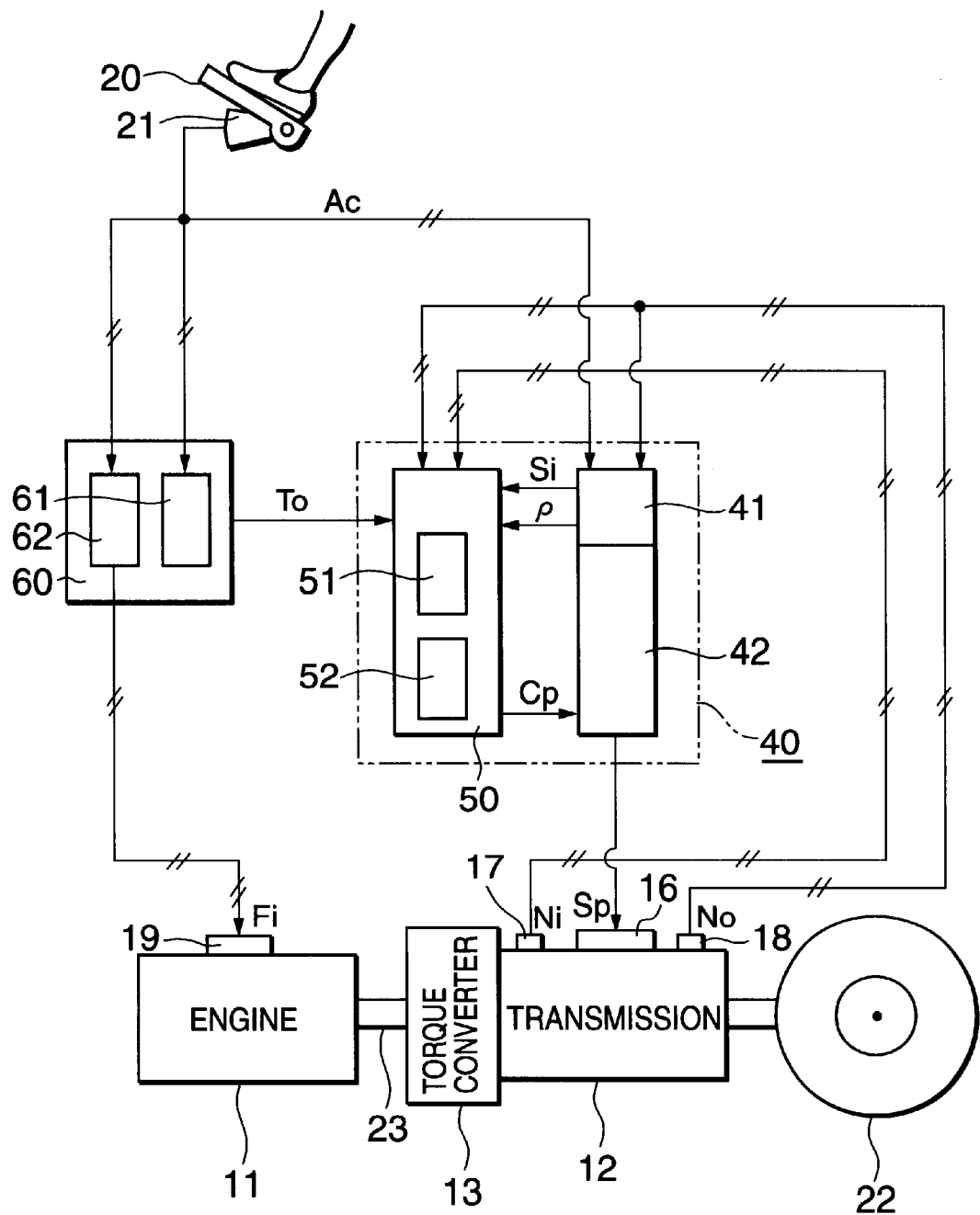
FIG. 5 is a schematic view of a hardware structure in accordance with a second embodiment of the present invention.

A block diagram of a hardware structure is shown in FIG. 5. A transmission 12 which engages or disengages a plurality of clutches (not shown) by turning on and off a clutch hydraulic pressure so as to select a speed stage is mounted to an output shaft 23 of an engine 11 via a torque converter 13. A rear tire wheel 22 corresponding to a drive wheel is mounted to an output shaft of the transmission 12 via a reduction gear (not shown) which is disposed in a downstream side of the transmission. A plurality of electromagnetic proportional control valves 16 which respectively supply a predetermined hydraulic pressure to a plurality of clutches for selecting the respective speed stages (hereinafter, the electromagnetic proportional control valve in each of the clutches is wholly called as an electromagnetic valve 16) is mounted to a predetermined place of the transmission 12. An accelerator pedal 20 which an operator actuates is provided close to the operator's feet.

As a detector, a transmission output shaft rotational speed detector 18 (hereinafter, refer to as an output speed detector 18) which measures a transmission output shaft rotational speed No (hereinafter, refer to as an output speed No) is mounted close to a periphery of the transmission output shaft. Further, a transmission input shaft rotational speed detector 17 (hereinafter, refer to as an input speed detector 17) which measures a transmission input shaft rotational speed Ni (hereinafter, refer to as an input speed Ni) is mounted close to a periphery of the transmission input shaft. An accelerator pedal operation amount detector 21 which detects an accelerator pedal operation amount Ac is provided in a lower portion of the accelerator pedal 20.

A transmission controller 40 and an engine controller 60 for controlling a fuel injection amount are provided as a controller.

The transmission controller 40 has a speed stage judging portion 41, an electromagnetic valve signal output portion 42 and a modulation control portion 50. In this case, the speed stage judging portion 41 determines a speed stage in accordance with a shift graph obtained on the basis of an accelerator opening degree Ac and an output speed No. The electromagnetic valve signal output portion 42 outputs an electromagnetic valve signal Sp for setting an incline of the hydraulic pressure of the clutch corresponding to the set speed stage to a fixed value of incline even when a vehicle body load expressing a load to the clutch changes. The modulation control portion 50 controls a start incline of the clutch hydraulic pressure and a start timing in correspondence to the vehicle body load.

The signals of the accelerator pedal operation amount Ac and the output speed No are input to the speed stage judging portion 41 via an input circuit (not shown). A shift start signal Si which is set to "1" when the speed stage is determined and to "0" when the speed stage is not determined, and a data of a speed reduction ratio of the speed stage before the shift operation ρ are output from the speed stage judging portion 41 to the modulation control portion 50.

A hydraulic pressure command Cp totally expressing an incline of the clutch hydraulic pressure M which expresses an incline in point of time of the clutch hydraulic pressure a command which sets the clutch hydraulic pressure before the shift operation Pn corresponding to the clutch to be disengaged before the shift operation to 0 value, and a command which stands up the clutch hydraulic pressure after the shift operation Pa corresponding to the clutch to be engaged after the shift operation is input from the modulation control portion 50 to the electromagnetic signal output portion 42. Further, an electromagnetic valve signal Sp which controls each of the clutch hydraulic pressure is output from the electromagnetic valve signal output portion 42 to the electromagnetic valve 16 via an output drive portion (not shown).

The modulation control portion 50 has vehicle body load detecting means 51 which detects a vehicle body load, and incline storing means 52 which stores a plurality of data concerning the incline of the clutch hydraulic pressure M. Each of data concerning a small incline Ms and a large incline Mb which are set at a time when the clutch engagement is started, and data concerning an engagement determination incline Mm which is set after the clutch engagement is completed and before the clutch hydraulic pressure reaches a predetermined maximum hydraulic pressure Pm are previously stored in the incline storing means 52. In this case, the small incline Ms is set when the vehicle body load is small, and has a value smaller than the large incline Mb which is set when the vehicle body load is large. Further, the engagement determination incline Mm which obtains the hydraulic pressure for securing the engagement of the clutch has a value larger than the large incline Mb.

The input speed Ni, the output speed No, the shift start signal Si and the speed reduction ratio of the speed stage before the shift operation ρ are respectively input to the modulation control portion 50 via an input circuit (not shown). Further, an engine output torque To is input to the modulation control portion 50 from an engine controller 60. The modulation control portion 50 outputs the hydraulic pressure command Cp to the electromagnetic valve signal output portion 42.

The engine controller 60 has an engine output torque calculating portion 60 which calculates an engine output torque on the basis of the accelerator pedal operation amount Ac, and a fuel injection amount calculating portion 62 which calculates a fuel injection amount command value to the fuel injection apparatus 19.

The accelerator opening degree Ac is input to the engine output torque calculating portion 61. Further, a calculated engine output torque To is output from the engine output torque calculating portion 61 to the modulation control portion 50.

The accelerator pedal operating amount Ac is input to the fuel injection amount calculating portion 62, and a fuel injection amount signal Fi is output from the fuel injection amount calculating portion 62 to the fuel injection apparatus 19 via an output drive portion (not shown).

Figure 6:
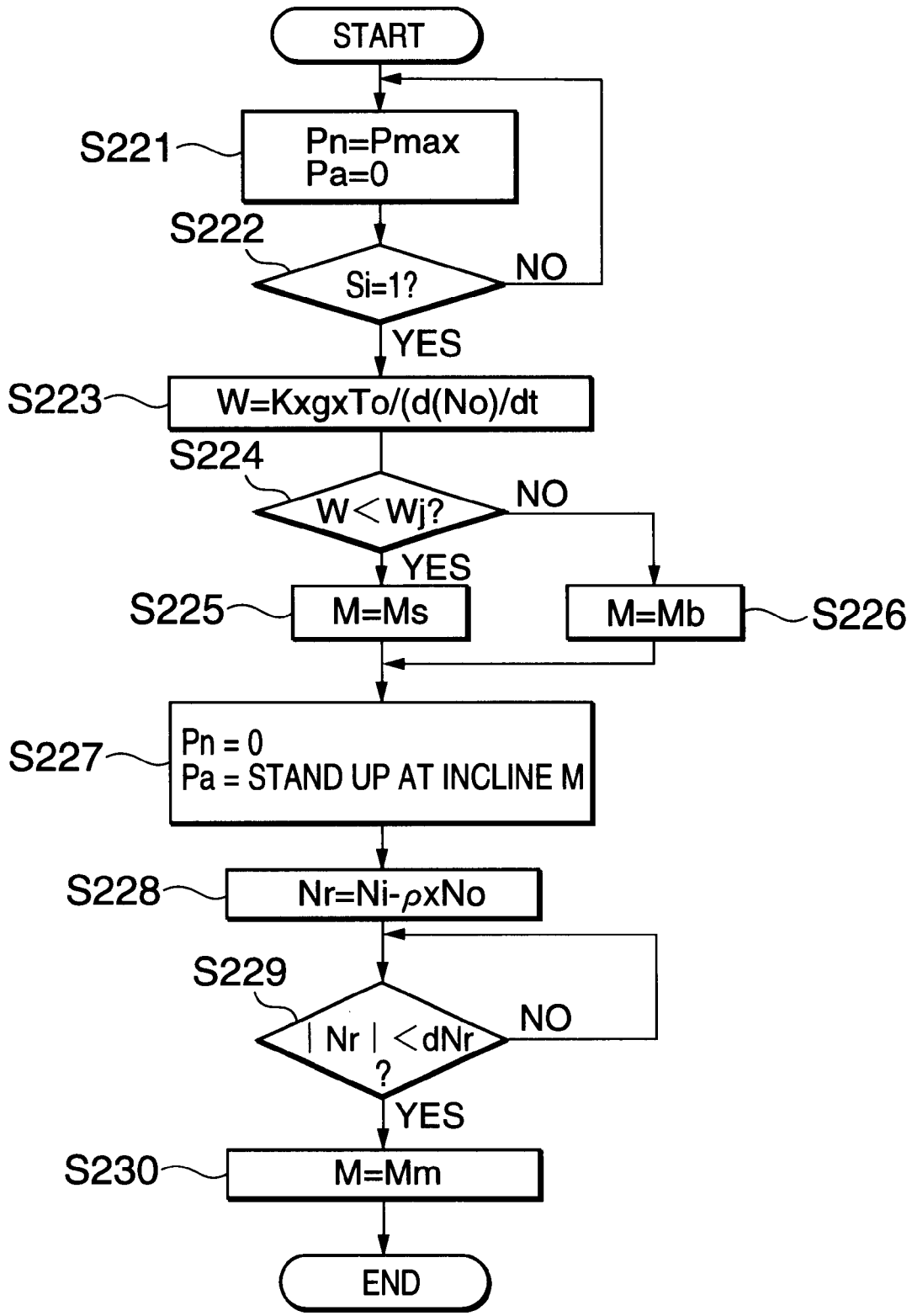
FIG. 6 is a control flow chart of a modulation control portion shown in FIG. 5.
Figure 7:
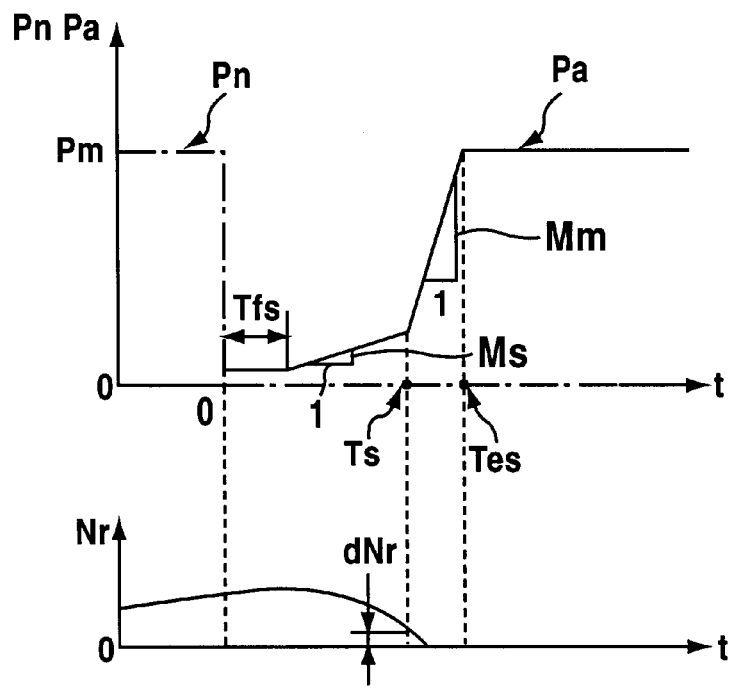
FIG. 7 is a view which shows a change in point of time of each of a clutch hydraulic pressure before a shift operation, a clutch hydraulic pressure after a shift operation and an input shaft conversion relative speed when a vehicle body load is small, and explains a change of a clutch hydraulic pressure incline.
Figure 8:
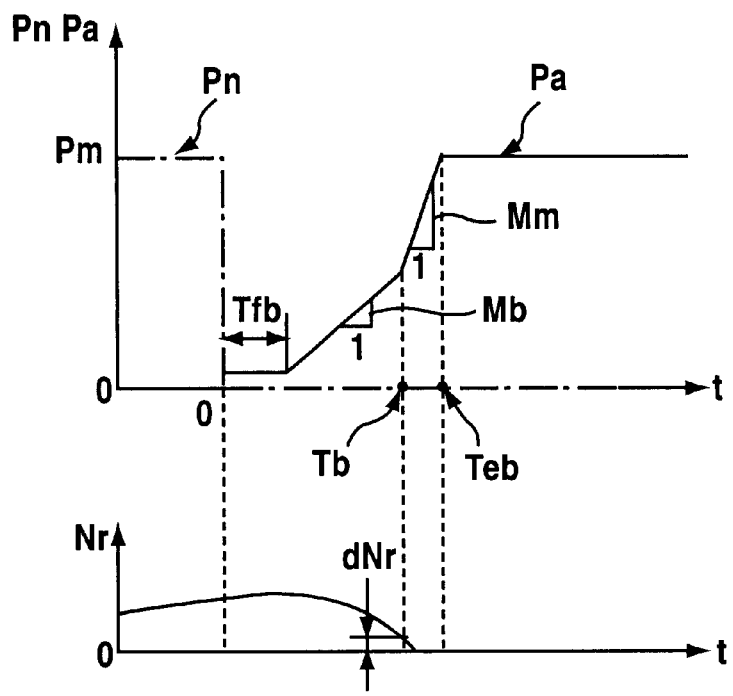
FIG. 8 is a view which shows a change in point of time of each of a clutch hydraulic pressure before a shift operation, a clutch hydraulic pressure after a shift operation and an input shaft conversion relative speed when a vehicle body load is great, and explains a change of a clutch hydraulic pressure incline.
Figure 9:
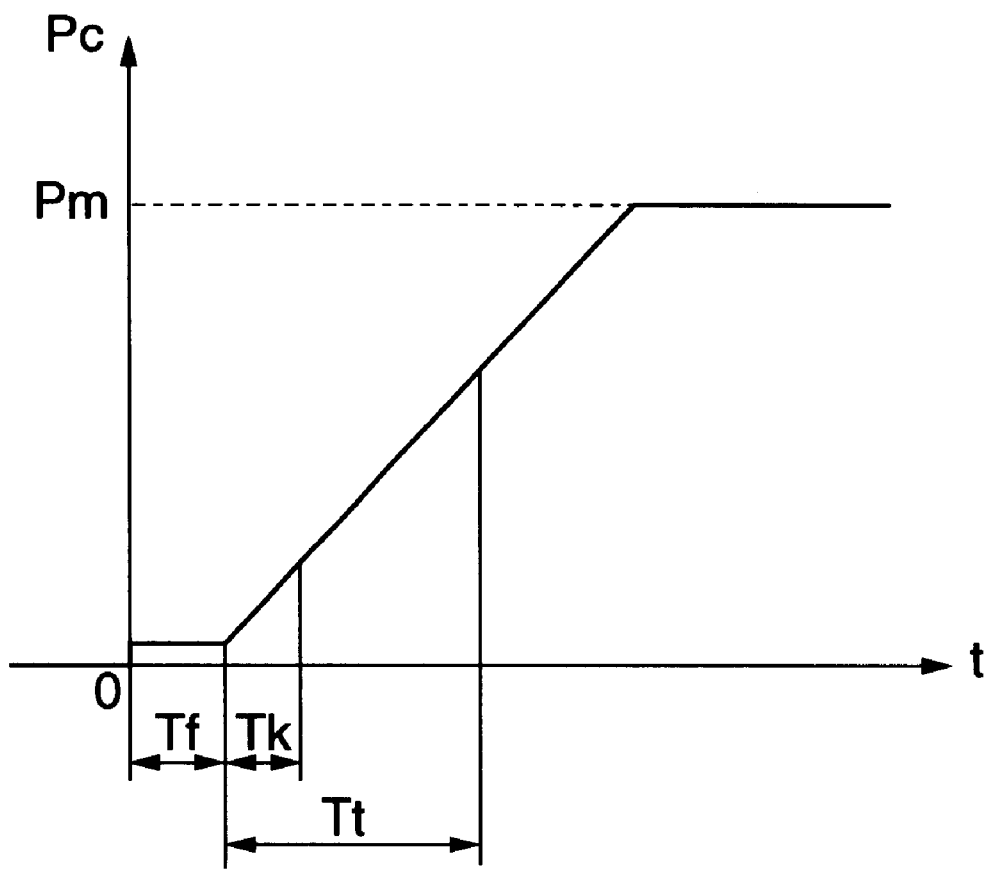
FIG. 9 is a view which explains an engagement completing time when a vehicle body load is great and small, in accordance with a typical example of a clutch hydraulic pressure.

A control flow chart of the modulation control portion 50 is shown in FIG. 6. FIG. 7 shows a change in point of time of each of a clutch hydraulic pressure before the shift operation Pn, a clutch hydraulic pressure after the shift operation Pa, and a transmission input and output relative rotational speed of a speed stage after the shift operation Nr (hereinafter, refer to as an input shaft conversion relative speed Nr) corresponding to a difference between the transmission input shaft rotational speed and the input shaft conversion rotational speed in the speed state after the shift operation of the transmission output shaft rotational speed, at a time when the vehicle body load is small. FIG. 8 shows a change in point of time of the same state amounts as those shown in FIG. 7, at a time when the vehicle body load is large. A control process procedure of the present embodiment will be described with reference to these drawings. In this case, in the description in FIG. 6, a reference symbol S is attached to a step number of each of the processes.

Before shifting, the clutch hydraulic pressure Pn before the shift operation is set to a predetermined maximum hydraulic pressure Pm, and the clutch hydraulic pressure Pa after the shift operation is set to 0 value (S221). Next, it is judged whether the shift determination signal determined in and output from the speed stage judging portion 41 is "1" or "0" (S222). When the shift determination signal Si is "0", the step again goes back to the process of S221. When it is "1", the time t is set to 0 and a travel resistance total load W which expresses the vehicle body load is calculated in the vehicle body load detecting means 51 in accordance with the following formula (1) on the basis of the output speed No and the engine output torque To (S223). In this case, the travel resistance total load W corresponds to a value obtained by adding a travel resisting force such as a component force in a direction of a traction force of the vehicle body weight due to an incline of the travel road, a frictional resisting force of the travel road surface and the like to the vehicle body weight including the loading weight.

$$W = K \times g \times To/(d(No))/dt) \qquad (1)$$

$d(No)/dt$: differentiation value in point of time of output speed No

K: coefficient of conversion g: acceleration of gravity

The coefficient of conversion K mentioned above includes a speed reduction ratio of the speed stage before the shift operation of the transmission, the speed reduction ratio after the transmission and the radius of the tire wheel.

It is judged whether or not the travel resistance total load W is smaller than a load threshold Wj corresponding to a predetermined times (for example, 1.5 times) the vehicle body weight Wk at a vacant load time (S224). When it is equal to or larger than the load threshold value Wj, the large incline Mb is set as shown in FIG. 8 as the incline of the clutch hydraulic pressure M which expresses the incline in point of time at a time of starting the clutch hydraulic pressure and when it is smaller, the small incline Ms is set as shown in FIG. 7, respectively by selecting from the incline storing means 52 (S225, S226). In this case, the value of the large incline Mb is previously set such that a clutch durability is not deteriorated and a small shift shock is obtained even in the case that the clutch calorie becomes equal to or more than a predetermined calorie when the vehicle body load is large, that is, the inertia of the vehicle body is large. Further, the value of the small incline Ms is previously set such that a time Ts until the clutch hydraulic pressure starts standing up and the engagement is completed when the vehicle body load is small is substantially equal to a time Tb until the clutch hydraulic pressure starts standing up and the engagement is completed when the vehicle body load is large, and a small shift shock is obtained.

The hydraulic pressure command Cp totally obtained by the clutch hydraulic pressure incline M set in the manner mentioned above, the commend setting the clutch hydraulic pressure before the shift operation Pn to 0 value, and the command for standing up the clutch hydraulic pressure after the shift operation Pa is replaced by the clutch hydraulic pressure command corresponding to a fixed incline value, and is output to each of the electromagnetic valves 16 via the electromagnetic valve signal output portion 42 (S227). Accordingly, the clutch hydraulic pressure before the shift operation Pn becomes 0 value, and the oil starts being supplied to the clutch chamber of the clutch after the shift operation After the oil is supplied to the clutch chamber of the clutch after the shift operation and the filling time (Tfs in FIG. 7 and Tfb in FIG. 8) corresponding to a time necessary for filling has passed, the hydraulic pressure stands up at the predetermined inclines Ms and Mb. In this case, since the filling times of the respective clutches after the shift operation are substantially equal to each other, the filling time Tfs when the vehicle body load is small and the filling time Tfb when the vehicle body load is large are substantially equal to each other.

Next, an input shaft conversion relative speed Nr expressed by the following formula (2) is calculated (S228), and it is judged whether or not an absolute value thereof is smaller than a predetermined transmission input and output relative rotational speed threshold of the shift stage after the shift operation dNr (hereinafter, refer to as a threshold dNr) (S229).

$$Nr = Ni - \rho \times No \qquad (2)$$

When it is equal to or larger than the threshold value dNr, the step goes back to the step S228 so as to again calculate the input shaft conversion relative speed Nr, and the processes mentioned above are repeated. When it is smaller, it is judged that the clutch completes the engagement, and next the clutch hydraulic pressure incline M is set to the engagement determination incline Mm selected from the incline storing means 52 (S230). A time judging the clutch completes the engagement is set to a small load time engagement completion time Ts when the vehicle body load is small, and to a large load time engagement completion time Tb when the vehicle body load is large. A time after the clutch hydraulic pressure stands up after the filling of the oil to the clutch chamber is completed and before the small load time engagement completion time Ts, or before the large load time engagement completion time Tb is called as an engagement time. The clutch hydraulic pressure incline M changed to the engagement determination incline Mm is replaced by the clutch hydraulic pressure having a fixed incline value as the hydraulic pressure command Cp and output to each of the electromagnetic valves 16 via the electromagnetic valve signal output portion 42, and the clutch hydraulic pressure reaches the predetermined maximum hydraulic pressure Pm at the engagement determination incline Mm, so that the shift operation is completed. A small load time shift completion time Tes and a large load time shift completion time Teb at which the shift operation is completely finished are respectively set in correspondence to the small load time and the large load time. A time after the clutch hydraulic pressure incline M becomes the engagement determination incline Mm and before the small load time shift completion time Tes or before the large load time shift completion time Teb is called as an engagement determination time for increasing the clutch hydraulic pressure so as to secure the engagement.

In accordance with the present embodiment, the clutch hydraulic pressure incline M is set to the small incline Ms when the travel resistance total load W is smaller than the load threshold Wj and to the large incline Mb when it is equal to or more than the load threshold Wj, thereby standing up the clutch hydraulic pressure The small incline Ms is previously set such that the engagement time after the clutch hydraulic pressure when the vehicle body load is small starts standing up and before the engagement is completed becomes substantially equal to the engagement time by the large incline Mb when the vehicle body load is large, and a small shift shock can be obtained. Accordingly, the clutch is always engaged at a small shift shock without reference to the magnitude of the vehicle body load.

An engagement time after the clutch hydraulic pressure stands up and before the clutch is engaged (between Tfs and Ts or between Tfb and Tb) is substantially equal without reference to a magnitude of the vehicle body load. Further, the filling time Tfs or Tfb necessary for filling the clutch chamber of the clutch after the shift operation with the oil until the clutch hydraulic pressure stands up is substantially equal in each of the clutches after the shift operation Accordingly, a total time of the filling time and the engagement time is substantially equal without reference to a magnitude of the vehicle body load.

Since the engagement determination incline Mm set as the incline after the absolute value of the input shaft conversion relative speed Nr becomes smaller than the threshold value dNr is a sufficiently large incline, the engagement determination time becomes substantially equal without reference to a magnitude of the vehicle body load.

As mentioned above, since it is possible to control the engagement time after the shift is started and before the engagement is completed to be substantially equal without reference to a magnitude of the vehicle body load and the engagement determination time after the engagement is completed and before the hydraulic pressure reaches the predetermined maximum hydraulic pressure Pm is substantially equal, it is possible to always obtain the substantially fixed shift time as a whole.

In this case, in accordance with the present embodiment, the start incline of the clutch hydraulic pressure is set to each of the vehicle body loads which are classified into the large one and the small one, however, it is possible to set the clutch start incline to each of the vehicle body loads which are classified into, for example, a large one, a middle one and a small one. Otherwise, it is possible to set a calculating formula for calculating the hydraulic pressure incline M in correspondence to the magnitude of the vehicle body load on the basis of a data of experiment, thereby calculating in accordance with the calculating formula.

In accordance with the present embodiment, the acceleration of the vehicle body is calculated by differentiating the transmission output shaft rotational speed in point of time, however, it is possible to use a detected value obtained by an acceleration meter mounted at a predetermined position in a longitudinal direction of the vehicle body. Further, the travel resistance total load is calculated on the basis of the engine output shaft torque and the vehicle body acceleration, however, the vehicle body weight may be directly measured by the other means which can measure the weight, for example, a fluid pressure of a hydro pneumatic suspension apparatus.

Further, in accordance with the present embodiment, the load threshold Wj is set as the formula 1.5×vacant time vehicle body weight Wk in order to widely classify the vehicle body load into the large one and the small one, however, may be set to a load threshold Wj easily sectioning the loading time and the vacant time.

As mentioned above, in accordance with the present invention, the clutch is engaged in accordance with the clutch hydraulic pressure incline in correspondence to the magnitude of the vehicle body load. Accordingly, it is possible to make the clutch engagement time substantially equal without reference to the magnitude of the vehicle body load, and further it is possible to reduce a shift shock. Further, the clutch hydraulic pressure is stood up at the engagement determination incline having the predetermined large incline value at the same time when the engagement is completed. Accordingly, it is possible to make the time after the engagement is completed and before the shift operation is completed shortest and set to be substantially equal without reference to the magnitude of the vehicle body load. Therefore, it is possible to obtain the substantially fixed shift desired time with a small shift shock for the shortest time without reference to the magnitude of the vehicle body load, so that the shift control apparatus having a good operability can be obtained.

In this case, in accordance with the present invention, the following effects can be further obtained.

Since the clutch hydraulic pressure is set to the engagement determination incline to the predetermined clutch maximum pressure at the same time when the clutch engagement is substantially completed, it is possible to rapidly obtain a secure engagement which does not slip when the engine maximum torque passes through the engagement clutch. Accordingly, it is possible to obtain the shift control apparatus having an acceleration feeling with a good response in correspondence to the engine accelerator opening degree.

Further, since it is possible to easily judge the magnitude of the vehicle body load by using the travel resistance total load, it is possible to obtain an inexpensive and actual shift control apparatus.

Next a description will be given of a third embodiment in accordance with the present invention with reference to the accompanying drawings.

Figure 10:
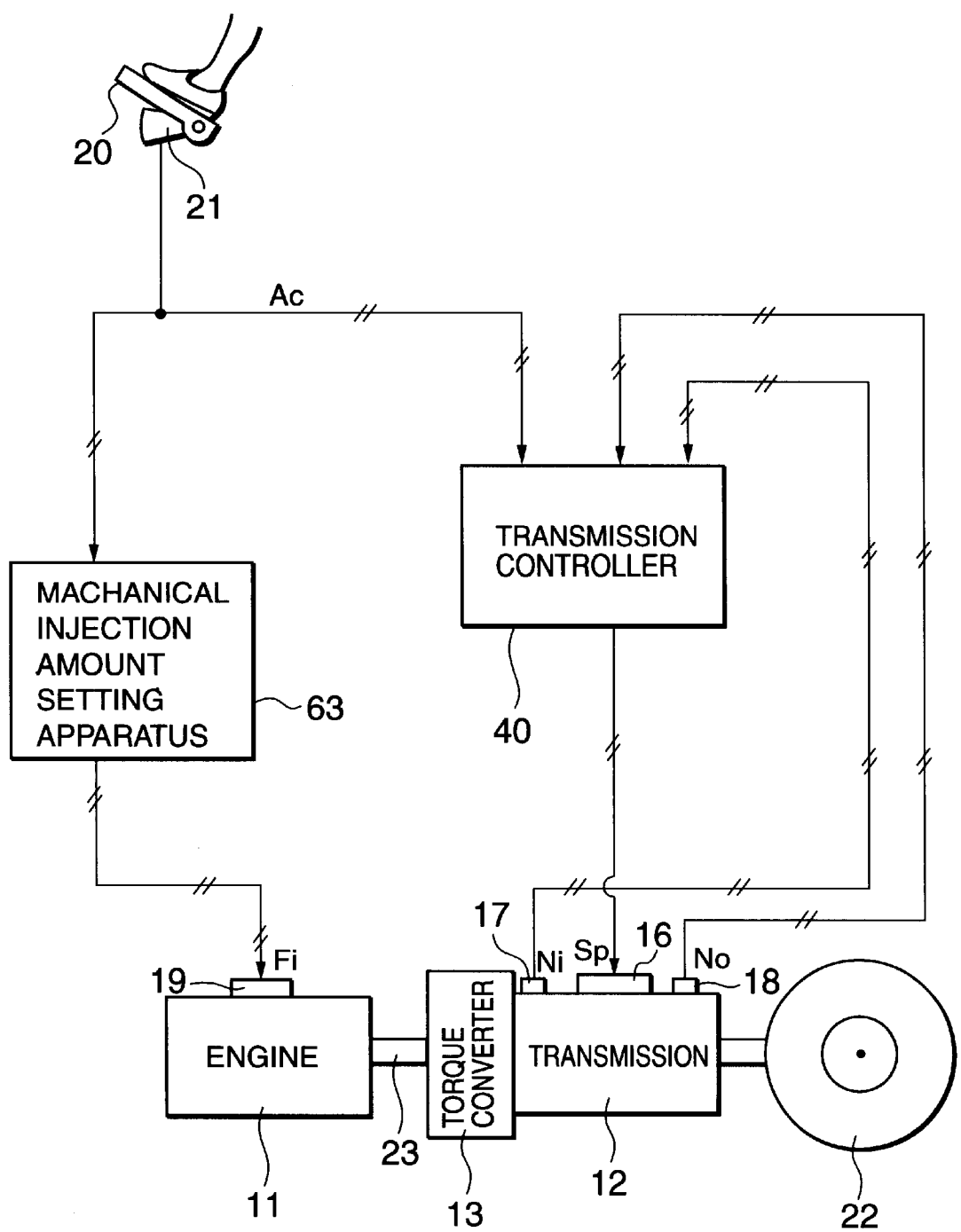
FIG. 10 is a block diagram of a hardware structure in accordance with a third embodiment of the present invention.

A block diagram of a hardware structure in accordance with the third embodiment is shown in FIG. 10. A transmission 12 which engages or disengages a plurality of clutches (not shown) by turning on and off a clutch hydraulic pressure so as to select a speed stage is mounted to an output shaft 23 of an engine 11 via a torque converter 13. A rear tire wheel 22 corresponding to a drive wheel is mounted to an output shaft of the transmission 12 via a reduction gear (not shown) which is disposed in a downstream side of the transmission. A plurality of electromagnetic proportional control valves 16 which respectively supply a predetermined hydraulic pressure to a plurality of clutches for selecting the respective speed stages (hereinafter, the electromagnetic proportional control valve in each of the clutches is wholly called as an electromagnetic valve 16) is mounted to a predetermined place of the transmission 12. An accelerator pedal 20 which an operator actuates is provided close to the operator's feet.

As a detector, a transmission output shaft rotational speed detector 18 which measures a transmission output shaft rotational speed No (hereinafter, refer to as an output speed No) is mounted close to a periphery of the transmission output shaft. Further, a transmission input shaft rotational speed detector 17 which measures a transmission input shaft rotational speed Ni (hereinafter, refer to as an input speed Ni) is mounted close to a periphery of the transmission input shaft. An accelerator pedal operation amount detector 21 which detects an accelerator pedal operation amount Ac is provided in a lower portion of the accelerator pedal 20.

An input speed Ni, an output speed No and an accelerator pedal operating amount Ac from the accelerator pedal operation amount detector 21 are input to a transmission controller 40, and the transmission controller 40 outputs an electromagnetic valve signal Sp for controlling a clutch hydraulic pressure to the electromagnetic valve 16.

A mechanical injection amount setting apparatus 63 determines a fuel injection amount command signal Fi for outputting to the fuel injection apparatus 19 of the engine 11 on the basis of the mechanical signal of the accelerator pedal operation amount Ac and commands to the fuel injection apparatus 19.

Figure 11:
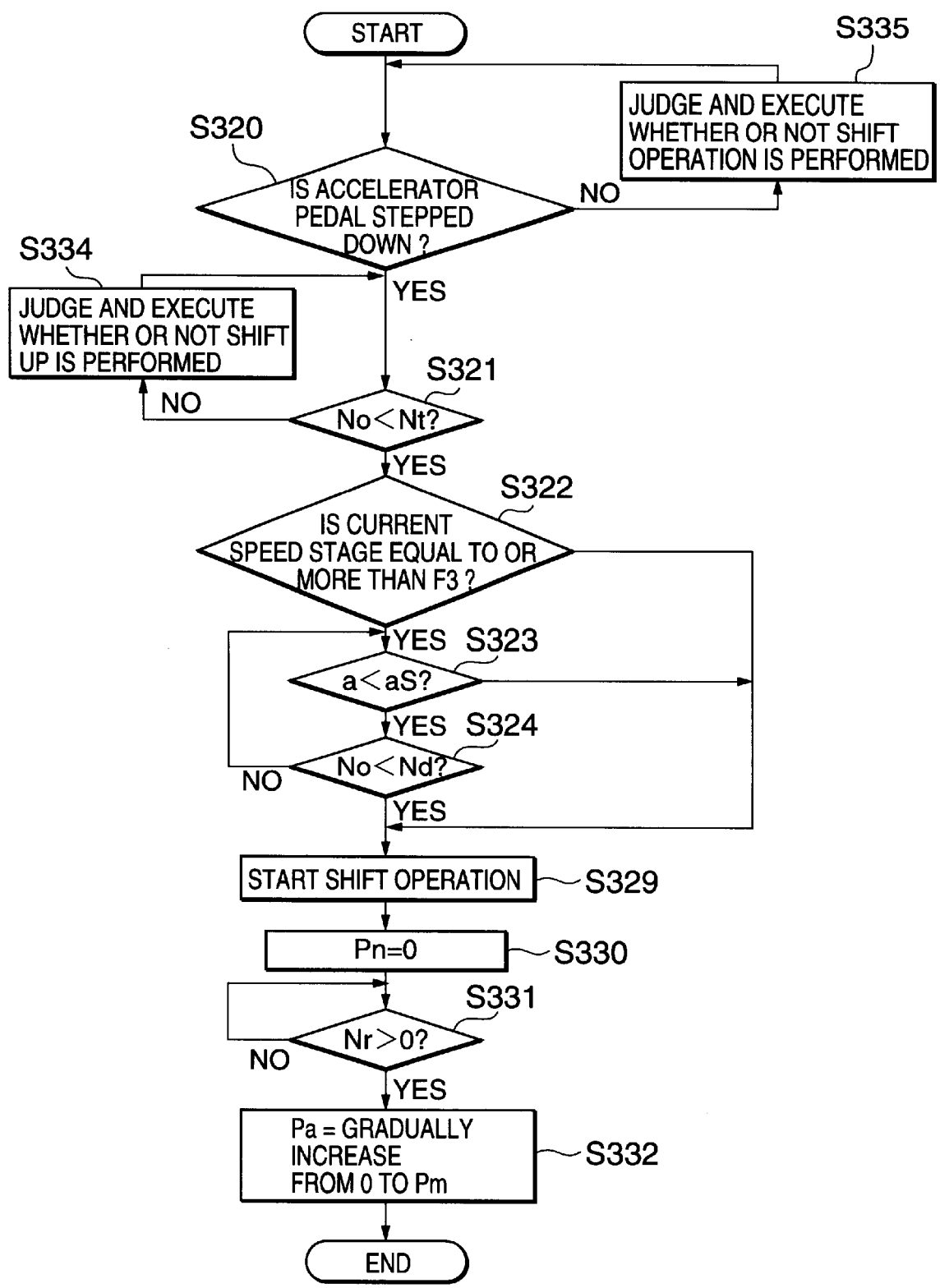
FIG. 11 is a control flow chart of a transmission controller shown in FIG. 10.

A control flow chart of the transmission controller 40 in accordance with the present embodiment will be shown in FIG. 11. In this case, in the description of FIG. 11, a reference symbol S is attached to each of process steps.

At first, in a step S320, it is judged on the basis of the accelerator pedal operation amount whether or not the accelerator pedal is stepped down. When it is not stepped down, it is judged in a step S335 whether a shift up or a shift down is performed and the step goes back to the step S320. The shift down or the shift up which is executed in the step S335 corresponds to a shift operation in accordance with a normal shift method in which the shift is performed one stage by one stage. When it is judged in the step S320 that the accelerator pedal is stepped down, next, it is judged whether or not the output speed No is smaller than the normal shift starting speed threshold Nt (S321). In this case, the normal shift starting speed threshold Nt corresponds to a threshold of the transmission output shaft rotational speed corresponding to the shift start judging standard for each of the speed stages and is previously stored in the shift graph. When the output speed No is equal to or more than the normal shift starting speed threshold Nt, the step goes back to the step S321 via a step S334 which judges whether or not a shift up is performed and executes. In this case, the shift up executed in the step S334 corresponds to a shift operation in accordance with a normal shift method in which the shift is performed one stage by one stage. When it is smaller than the normal shift starting speed threshold Nt, it is judged whether or not the current speed stage is equal to or more than F3 (S322). When the current speed stage is a low speed stage including F2, the shift method is determined to the normal shift in which the shift is performed to the low speed stage one stage by one stage, and the shift operation is started in the step S329.

When the current speed stage is equal to or more than F3, that is, when the current speed stage is a high speed stage including F3, it is judged whether or not a vehicle acceleration a is smaller than a predetermined acceleration threshold aS (S323). In this case, the vehicle acceleration a is calculated by differentiating the output speed No in point of time. Further, when the acceleration a has a negative value, it expresses that the vehicle speed is reduced. The acceleration threshold aS corresponds to a value calculated on the basis of the vehicle weight at a vacant time, a maximum torque output by the engine, a speed reduction ratio of the current speed stage and a speed reduction ratio of the speed stage in the lower speed side than the current speed stage, and the acceleration threshold aS in correspondence to each of the speed stages is previously calculated and stored in the transmission controller 40.

Here, a description will be given of a method of calculating the acceleration threshold aS which is previously stored in the transmission controller 40. When it is supposed that a total speed reduction ratio between the engine output shaft and the tire wheel is $\rho 0$ in the current speed stage and $\rho 1$ in the speed stage one stage lower than the current speed stage, an equation of motion of the vehicle when ascending the travel road having an incline $\theta$ can be expressed by the formulas (3) and (4).

$$Mk \times a0 = T \times \rho 0/r - Mk \times g \times \sin \theta \quad (3)$$

$$Mk \times a1 = T \times \rho 1/r - Mk \times g \times \sin \theta \quad (4)$$

Mk: value obtained by dividing vehicle weight at vacant state by an acceleration of free fall g a0: acceleration of vehicle at current speed stage a1: acceleration of vehicle at speed stage one stage lower than current speed stage T: maximum torque of engine output r: radius of tire wheel of vehicle g: acceleration of free fall Here, when it is supposed that vehicle is in a state capable of traveling in one stage lower speed stage and having a positive acceleration, the formula (4) is positive and the following formula (5) is established.

$$Mk \times g \times \sin\theta \leq T \times \rho 1/r \quad (5)$$

The following formula (6) is introduced from the formulas (5) and (3).

$$a0 \geq T \times (\rho 0 - \rho 1)/(Mk \times r) = aX \quad (6)$$

A value calculated in accordance with the formula "T×(ρ0−ρ1)/(Mk×r)" in the formula (6) corresponds to a threshold for judging whether the shift down to one stage lower speed stage or the shift down to two stage lower speed stage is performed. The threshold is called as a one stage shift threshold aX, and when the current vehicle acceleration a0 is equal to or more than the one stage shift threshold aX, the shift to one stage lower speed stage than the current speed stage is performed. Further, when the current vehicle acceleration a0 is smaller than the one stage shift threshold aX, the shift to two stage lower shift stage than the current speed stage is performed. Since the speed reduction ratio ρ1 of the one stage lower speed stage has a value larger than the speed reduction ratio ρ0 of the current speed stage, the one stage shift threshold aX is a threshold having a negative value. The negative value of the vehicle acceleration having a greater absolute value indicates that the speed reduction degree of the vehicle is rapid. In this case, the one stage shift threshold aX for judging whether the speed stage after the shift is the two stage lower speed stage or the one stage lower speed stage is calculated on the basis of the vehicle weight at the vacant state. When it is judged in accordance with the one stage shift threshold aX calculated on the basis of the vehicle weight at the vacant state that the traction force is insufficient in the case of the one stage lower speed stage, it is possible to judge that the traction force is always insufficient in the case of the one stage lower speed stage when the vehicle carries the load thereon. Accordingly, the calculating method of the threshold in accordance with the formula (6) utilizing the vehicle weight at the vacant state is a simple and secure method which can correspond to all the loading conditions.

When the vehicle acceleration a is equal to or more than the acceleration threshold aS, the normal shift is determined, and the shift is started in the step S329. When the vehicle acceleration a is smaller than the acceleration threshold aS, the jump shift is determined and it is judged whether or not the output speed No is smaller than a jump shift starting speed threshold Nd (S324). In this case, the jump shift starting speed threshold Nd is a threshold for preventing the engine from overrunning at the shifting time, and in general, a value smaller than the shift starting speed threshold Nt is previously stored in the transmission controller 40.

Figure 12:
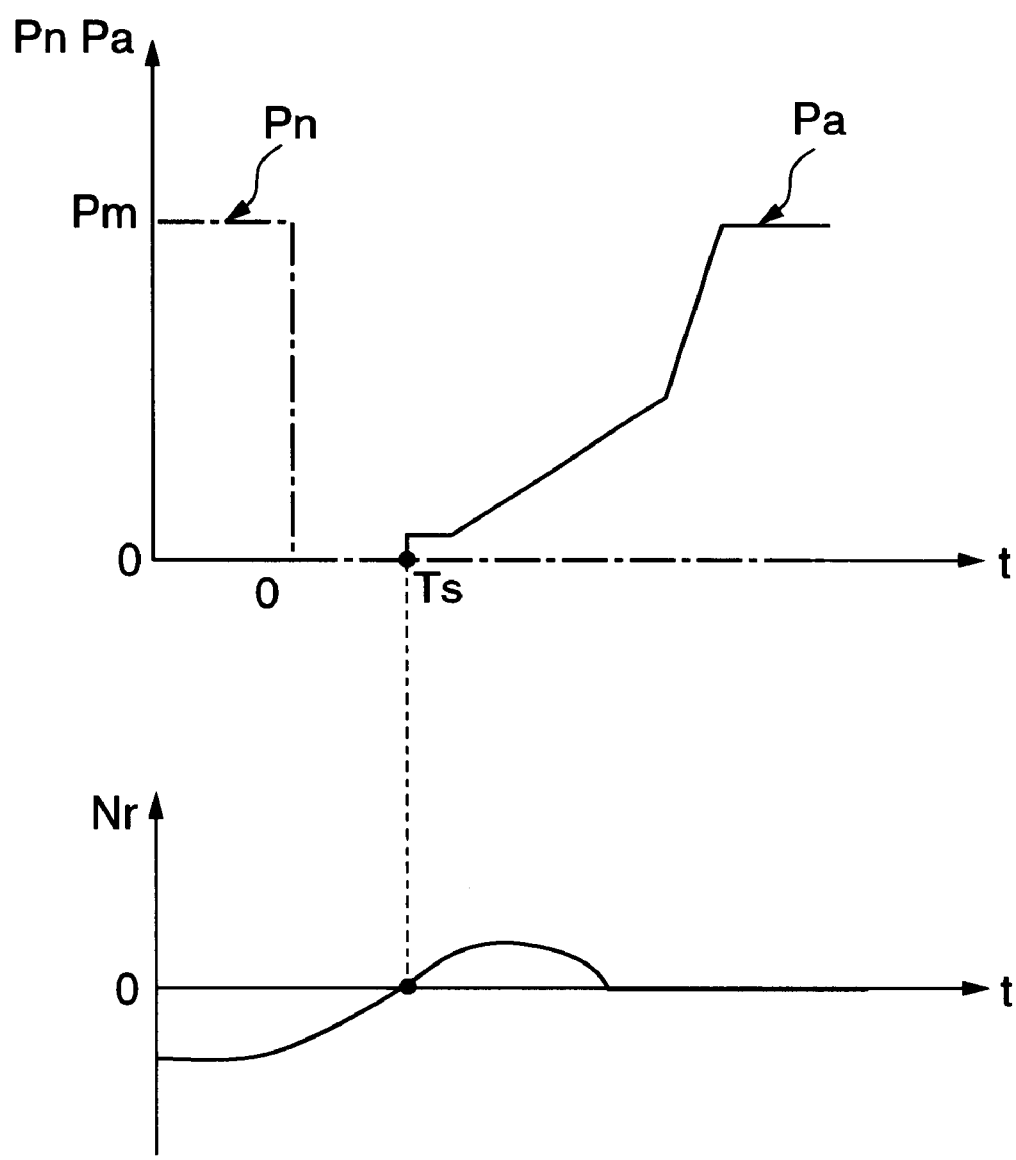
FIG. 12 is a schematic view of a relation among a hydraulic pressure of a clutch before a shift operation, a hydraulic pressure of a clutch after a shift operation and an input shaft conversion relative speed.

Even when the step S323 judges that the vehicle acceleration a is smaller than the acceleration threshold aS and the jump shift is determined, the step goes back to the step S323 while keeping the current speed stage when the output speed No is equal to or more than the jump shift starting speed threshold Nd, and it is continuously judged whether or not the vehicle acceleration a is smaller than the acceleration threshold aS, and thereafter the shift is started in the step S329 after the output speed No becomes smaller than the jump shift starting speed threshold Nd. In this case, the time for starting the shift is set to 0 in a time t of a horizontal axis as shown in FIG. 12. At first, the clutch hydraulic pressure Pn of the clutch before the shift operation engaged before the shift operation is set to 0 value (S330). Next, it is judged whether or not the input shaft conversion relative speed Nr expressed by the formula "Nr=Ni−ρ×No" is positive (S331). In this case, ρ is a speed reduction ratio of the speed stage after the shift operation and is stored in the transmission controller 40 as the data. When the input shaft conversion relative speed Nr is smaller than 0 value, the process waits in the step S331 until the input shaft conversion relative speed Nr becomes positive. When the input shaft conversion relative speed Nr becomes positive from negative at a relative speed 0 time Ts shown in FIG. 12, the clutch hydraulic pressure Pa of the clutch after the shift operation corresponding to the new speed stage after the shift operation is gradually increased toward the maximum hydraulic pressure Pm (S332).

In accordance with the present embodiment, when the output rotation is smaller than the predetermined normal shift starting speed threshold and the calculated acceleration obtained by differentiating the output rotation in point of time is equal to or more than a predetermined acceleration, the normal shift is determined and the shift down is performed from the current speed stage to the one stage lower speed stage. Further, even in the case that the calculated acceleration is smaller than the predetermined acceleration, when the output rotation is equal to or more than the predetermined jump shift starting speed threshold, the current speed stage is kept. When the calculated acceleration is smaller than the predetermined acceleration and the output rotation is smaller than the predetermined shift starting speed threshold, the jump shift is determined and the jump shift down from the current speed stage to the two stage or more lower speed stage is performed. Accordingly, even when the vehicle speed is rapidly reduced, the operator needs not manually perform the jump shift by using the shift lever in the conventional manner and it is possible to shift to the lower speed stage in a jump manner so as to reduce the number of the shift operation, so that it is possible to obtain a shift control apparatus having an excellent operability.

Further, without reference to the normal shift or the jump shift, the vehicle speed is reduced in a state that the hydraulic pressure of all the clutches becomes 0 value by setting the hydraulic pressure Pn of the clutch before the shift operation to 0 value at a time of starting the shift. When the input shaft conversion relative speed Nr is increased from the negative value to reach 0 value together with the reduction of the vehicle speed, that is, after the relative speed of the clutch becomes 0 value, the hydraulic pressure Pa of the clutch after the shift operation is stood up. Accordingly, it is possible to reduce the engagement shock of the clutch and it is possible to obtain an excellent drive feeling.

In this case, in accordance with the present embodiment, the acceleration of the vehicle is calculated by differentiating the transmission output shaft rotational speed in point of time, however, it is possible to utilize the acceleration detected by the acceleration detector for detecting the acceleration of the vehicle in the forward moving direction.

Further, the standing time of the hydraulic pressure Pa of the clutch after the shift operation is judged in accordance with the result whether or not the input shaft conversion relative speed Nr is greater than 0 value, however, it is possible to judge in accordance with the result whether or the absolute value of the input shaft conversion relative speed Nr is greater than the predetermined rotational speed threshold near 0 value.

Figure 13:
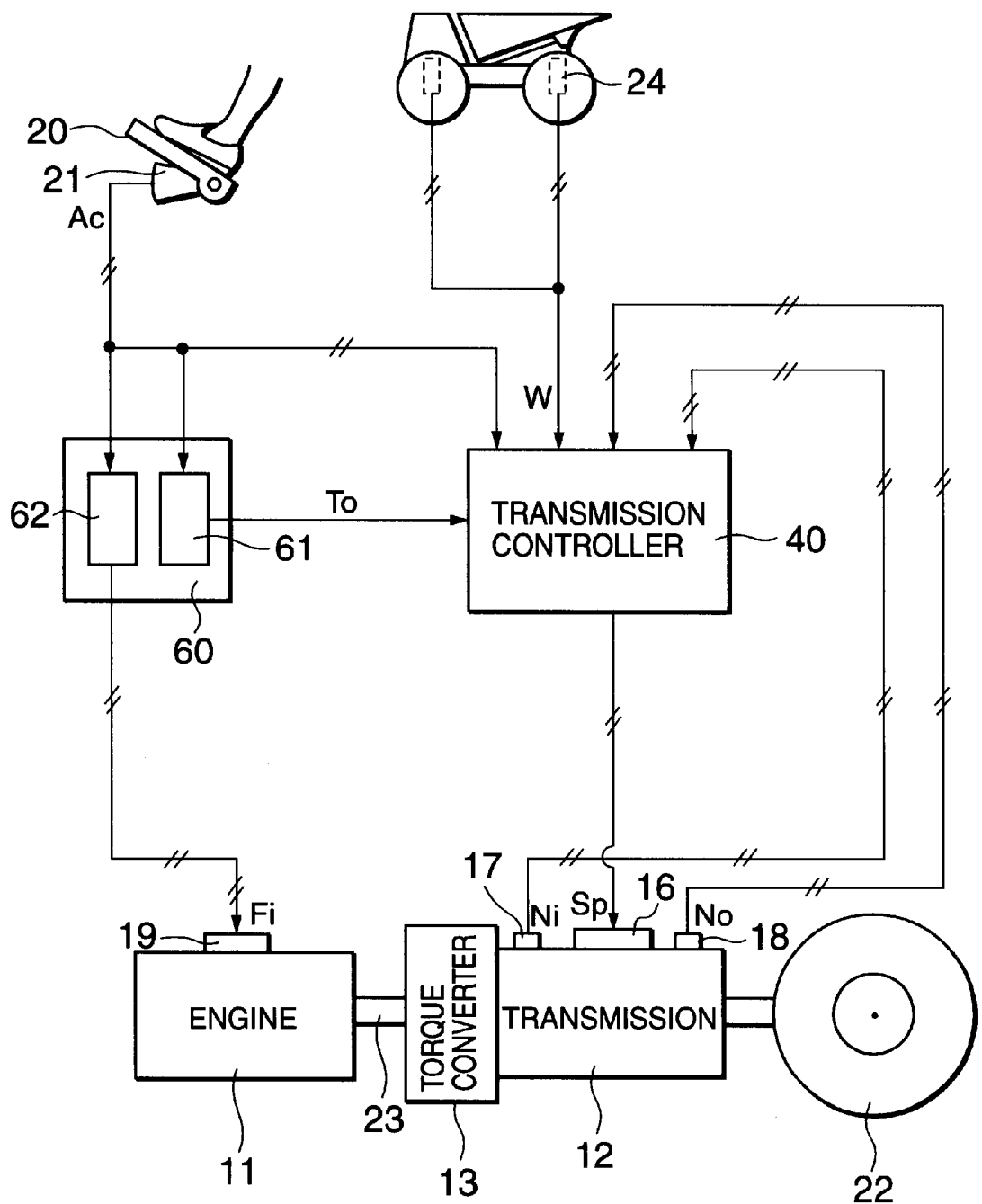
FIG. 13 is a block diagram of a hardware structure in accordance with a fourth embodiment.

Next, a block diagram of a hardware structure in accordance with a fourth embodiment is shown in FIG. 13. The same reference numerals are attached to the same elements as those shown in the block diagram of the hard structure shown in FIG. 10 explained in the third embodiment, and a description will be given of only different portions.

As a detector, a vehicle weight detector 24 which measures a fluid pressure of a suspension apparatus in accordance with a hydraulic pressure, an air pressure or a combination of the hydraulic pressure and the air pressure for suspending a working vehicle so as to detect a vehicle weight W, is provided at a predetermined position of the suspension apparatus, and the weight detecting signal W is input to the transmission controller 40.

In accordance with the present embodiment, in addition to the transmission controller 40, an engine controller 60 is provided. The engine controller 60 is provided with an engine output torque calculating portion 61 which calculates an engine output torque To on the basis of the accelerator pedal operation amount Ac, and the engine output torque calculating portion 61 outputs the calculated engine output torque To to the transmission controller 40. Further, the engine controller 60 has a fuel injection amount calculating portion 62 which calculates the fuel injection amount on the basis of the accelerator pedal operation amount Ac, and outputs the calculated fuel injection amount signal Fi to the fuel injection apparatus 19.

Figure 14:
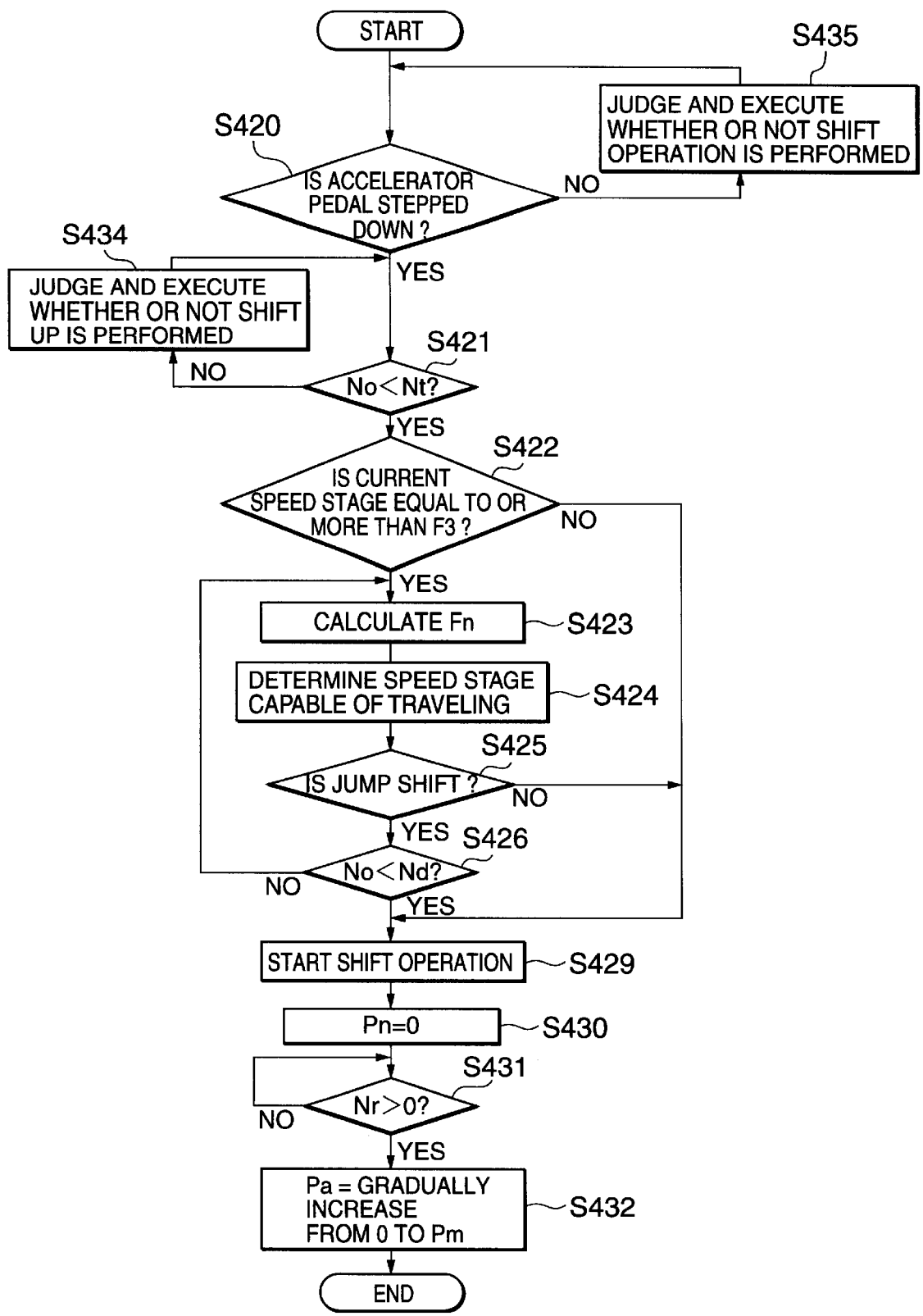
FIG. 14 is a control flow chart of a transmission controller shown in FIG. 13.

A control flow chart of the transmission controller 40 in accordance with the present embodiment will be shown in FIG. 14. In this case, in the description of FIG. 14, a reference symbol S is attached to each of process steps.

At first, in a step S420, it is judged on the basis of the accelerator pedal operation amount whether or not the accelerator pedal is stepped down. When it is not stepped down, it is judged in a step S435 whether a shift up or a shift down is performed and the step goes back to the step S420. The shift down or the shift up which is executed in the step S435 corresponds to a shift operation in accordance with a normal shift method in which the shift is performed one stage by one stage. When it is judged in the step S420 that the accelerator pedal is stepped down, next, it is judged whether or not the output speed No is smaller than the normal shift starting speed threshold Nt (S421). When the output speed No is equal to or more than the normal shift starting speed threshold Nt, the step goes back to the step S421 via a step S434 which judges whether or not a shift up is performed and executes, and it is continuously judged whether or not the output speed No is smaller than the normal shift starting speed threshold Nt. In this case, the shift up executed in the step S434 corresponds to a shift operation in accordance with a normal shift method in which the shift is performed one stage by one stage. When it is smaller than the normal shift starting speed threshold Nt, it is judged whether or not the current speed stage is equal to or more than F3 (a high speed stage including F3 speed) (S422). When the current speed stage is a low speed stage including F2, the shift method is determined to the normal shift, and the shift operation is started in the step S429. When the current speed stage is equal to or more than F3, a necessary traction force Fn of a propelling force required for traveling at a fixed vehicle speed is calculated (S423). A method of calculating the required traction force Fn will be described below.

An equation of motion of the working vehicle when ascending on the travelling road having an incline of θ can be generally shown by the following formula (7).

$$F - W \times \sin \theta = m \times a \quad (7)$$

F: propelling force of vehicle
W: vehicle weight m: value obtained by dividing W by an acceleration of free fall g
a: acceleration of vehicle in a forward moving direction Accordingly, the necessary traction force Fn corresponding to the value obtained by subtracting the acceleration force (m×a) from the propelling force F can be expressed by the following formula (8).

$$Fn = F - (m \times a) = W \times \sin \theta \quad (8)$$

F: propelling force of vehicle calculated on the basis of engine output torque To
W: vehicle weight detected by vehicle weight detector 24
m: value expressing vehicle mass and obtained by dividing W by an acceleration of free fall g
a: acceleration of vehicle in a forward moving direction calculated on the basis of output rotation No In this case, since the above values are already detected and calculated, the necessary traction force Fn can be calculated.

Figure 15:
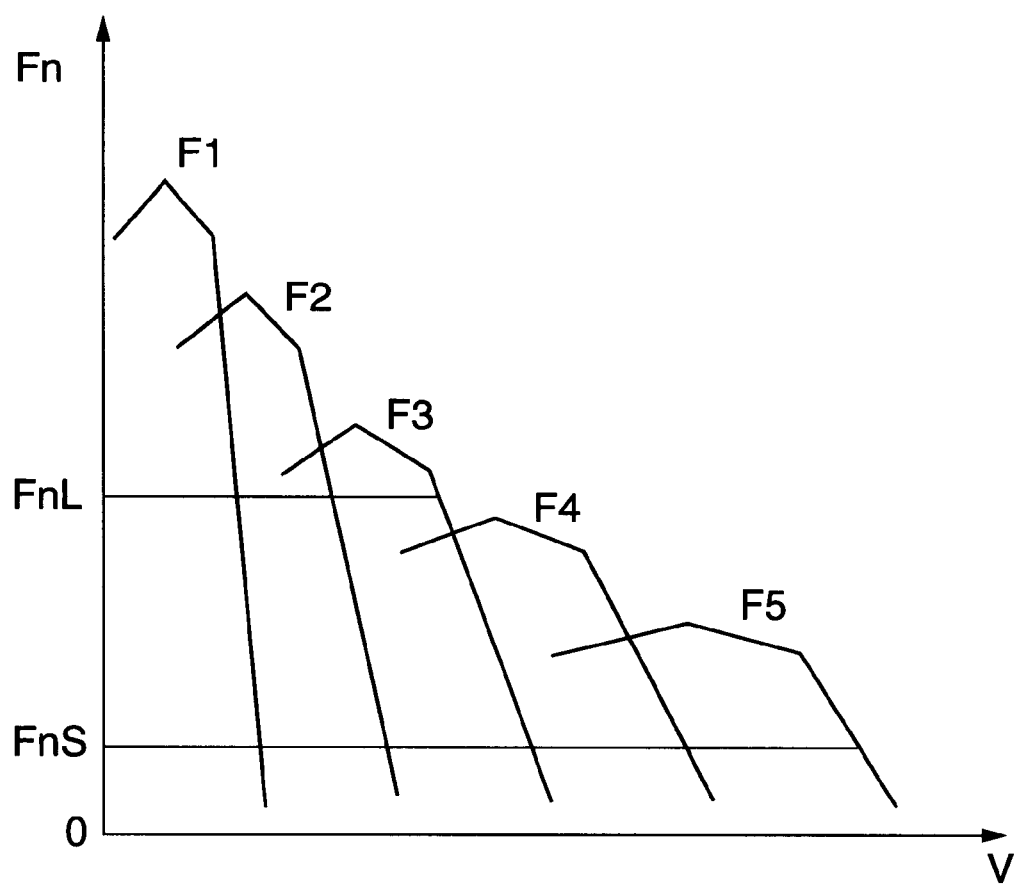
FIG. 15 is a schematic view of a relation between a vehicle speed and a traction force.

Here, a relation between the vehicle speed V and the necessary traction force Fn will be shown in FIG. 15. This V-Fn curve is previously calculated on the basis of the output torque performance curve of the engine and the speed reduction ratio at each of the speed stages and stored in the transmission controller 40. When the necessary traction force Fn is, for example, FnS, it is possible to travel in F5 and when it is FnL, it is possible to travel in F3.

When the calculated necessary traction force Fn is, for example, FnL, the speed stage capable of traveling is determined to F3 (S424). Next, it is judged in a step S425 whether or not the current speed stage is the jump shift, and when the current speed stage is F5, it is judged in the step S425 that the current speed stage is the jump shift and it is judged in a step S426 whether or not the output rotation No is smaller than the jump shift starting speed threshold Nd, and when it is smaller, the jump shift is determined and the shift is started in a step S429. When the output rotation No is equal to or more than the jump shift starting speed threshold Nd, the step goes back to the step S423 while keeping the current speed stage and the calculation of the necessary traction force Fn is continued. When it is judged in the step S425 that the shift to the adjacent speed stage is judged, the normal shift in which the shift is performed one stage by one stage is determined, and the shift is started in the step S429. Steps S430, S431 and S432 in the control flow after the shift is started in the step S429 are the same as the steps S330, S331 and S332 in the control flow explained in FIG. 11, and an explanation thereof will be omitted.

In accordance with the present embodiment, the necessary traction force Fn required for the travel at the fixed vehicle speed is calculated on the basis of the vehicle weight W detected by the vehicle weight detector, the engine output torque To calculated in the engine output torque calculating portion and the acceleration a in the vehicle forward moving direction calculated by the controller. The speed stage capable of traveling is determined on the basis of the calculated necessary traction force Fn and the vehicle speed—traction force curve, and when the determined speed stage is not adjacent to the current speed stage, the shift operation is performed in a jump manner without passing through the middle shift stage. Accordingly, since the number of the shift operation is reduced, the operator needs not manually operates the shift lever in a jump manner in the same manner as that of the first embodiment, so that it is possible to obtain a shift control apparatus having an excellent operability. Further, since the state amount changing in point of time such as the vehicle propelling force and the vehicle acceleration, and the vehicle weight capable of judging the loading state can be finely reflected to the next speed stage, it is possible to obtain a shift control apparatus corresponding to the operation feeling of the operator.

Figure 16:
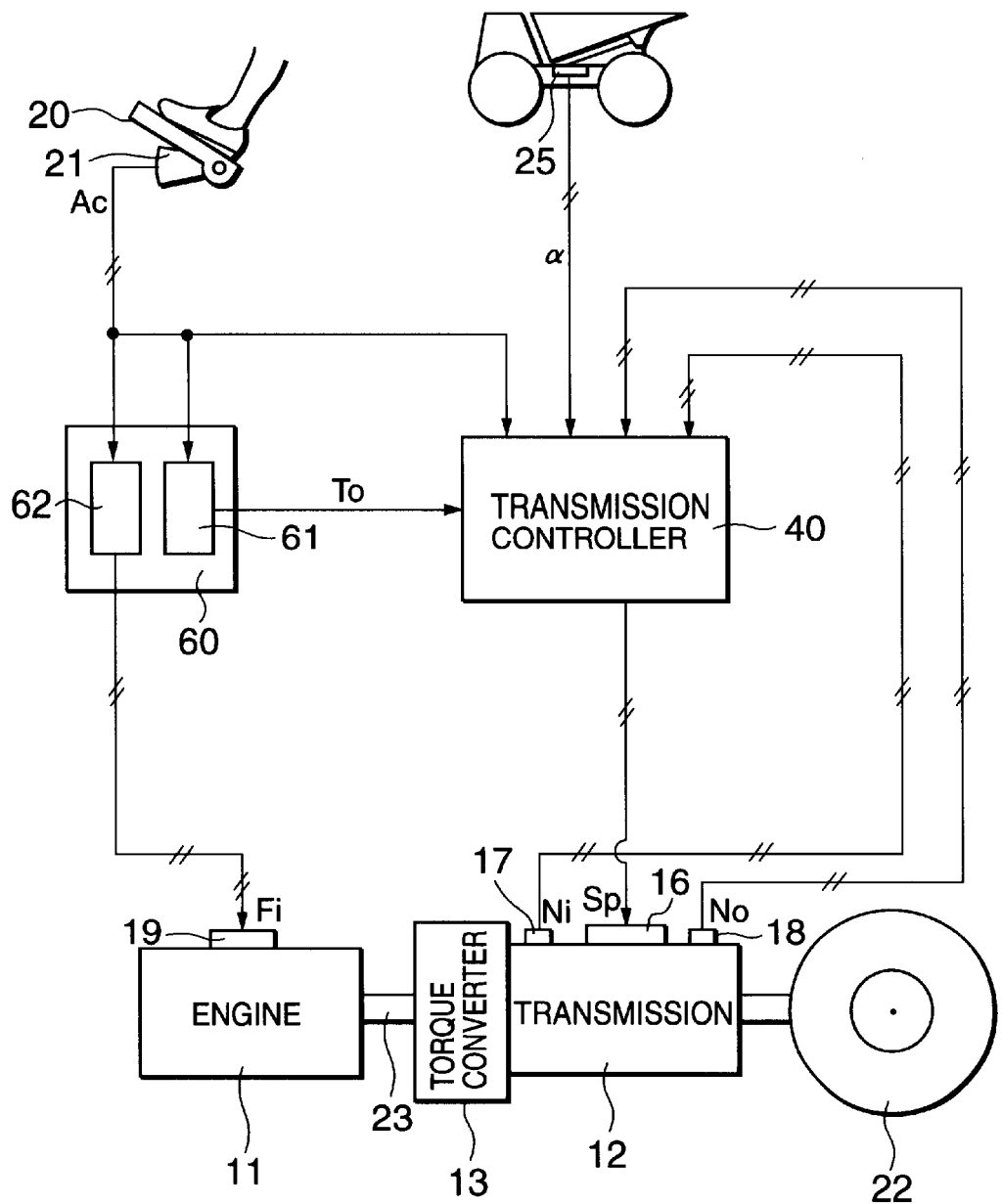
FIG. 16 is a block diagram of a hardware structure in accordance with a fifth embodiment.

Next, a block diagram of a hard structure in accordance with a fifth embodiment is shown in FIG. 16. The same reference numerals are attached to the same elements as those of the hard structure in the block diagram shown in FIG. 13, an explanation thereof will be omitted, and a description will be given of only different portions.

As a detector, the vehicle weight detector 24 shown in FIG. 13 is taken out, and an acceleration detector 25 for detecting an acceleration in a forward moving direction of the vehicle is mounted to a predetermined position of the vehicle, and a detected acceleration a is input to the transmission controller 40.

Since the control flow chart of the transmission controller 40 in accordance with the present embodiment is the same as the control flow chart shown in FIG. 14 in accordance with the fourth embodiment, an illustration thereof will be omitted. A description will be given of only a method of calculating the necessary traction force Fn which is different from the forth embodiment.

In accordance with the formula (7) mentioned above, the following formula (9) can be obtained.

$$F=(m \times a)+(W \times \sin \theta)$$
$$=m \times (a+g \times \sin \theta)$$
$$=m \times \alpha \qquad (9)$$

By substituting the vehicle mass m which can be introduced from the formula (9) for the formula (8) mentioned above, the necessary traction force Fn can be calculated in accordance with the following formula (10).

$$Fn=F \times (1-a/\alpha) \qquad (10)$$

F: propelling force of vehicle calculated on the basis of engine output torque To a: acceleration in a vehicle forward moving direction calculated on the basis of output rotation No α: acceleration detected by acceleration detector 25

An acceleration obtained by adding the vehicle acceleration in the vehicle moving direction to the acceleration of free fall can be detected. That is, when the vehicle is in an inclined place, a value obtained by adding a component force (g×sin θ) in the vehicle forward moving direction of the acceleration of free fall g caused by the oblique incline θ to the acceleration a in the vehicle forward moving direction can be detected.

On the basis of the necessary traction force Fn calculated in this manner, the speed stage capable of traveling is determined in the step S424 in the control flow shown in FIG. 14. Since the latter steps are the same as those in the control flow described in the fourth embodiment, the description thereof will be omitted.

In accordance with the present embodiment, the necessary traction force Fn required for the fixed vehicle speed travelling is calculated on the basis of the acceleration a detected by the acceleration detector for detecting the acceleration in the vehicle forward moving direction, the engine output torque To calculated in the engine output torque calculating portion and the acceleration a in the vehicle forward moving direction calculated by the controller. The speed stage capable of traveling at a time of judging the shift start is determined on the basis of the calculated necessary traction force Fn and the vehicle speed—traction force curve, and the shift to the determined speed stage is performed in a jump manner without passing through the middle shift stage. Accordingly, in the same manner as that of the third embodiment, the operator needs not manually operates the shift lever in a jump manner and the number of the shift operation is reduced, so that it is possible to obtain a shift control apparatus having an excellent operability.

Further, since the state amount changing in point of time such as the vehicle propelling force and the vehicle acceleration, and the vehicle weight capable of judging the loading state can be finely reflected to the determination of the next speed stage, it is possible to obtain a shift control apparatus corresponding to an operation feeling of the operator.

As mentioned above, in accordance with the present invention, in addition to the normal shift in which the shift operation is performed one stage by one stage, the speed stage after the shift operation is provided with the jump shift in which the shift operation can be performed without passing through the middle shift stage, and the shift operation to the shift stage after the shift operation is performed in a jump manner when the speed stage after the shift operation is not adjacent to the current speed stage. Accordingly, it is possible to reduce the number of the shift operation and it is possible to obtain an excellent drive condition.

When the acceleration of the vehicle which is determined by differentiating the transmission output shaft rotational speed in point of time is smaller than the predetermined acceleration threshold, the jump shift is determined and performed. Further, the speed stage capable of traveling is determined on the basis of the necessary traction force, and when one or more speed stage exists between the current speed stage and the speed stage capable of traveling, the jump shift is determined and performed. In accordance therewith, since the shift operation to the speed stage after the shift operation is performed without passing through the middle speed stage in the case that the vehicle speed is suddenly reduced by entering from the flat road to the ascending road having a great incline, it is possible to reduce the number of the shift operation and the operator needs not manually operates the shift down in a jump manner in the same manner as that of the conventional manner, so that it is possible to obtain a shift control apparatus of an industry vehicle having a good operability.

Further, the shift operation is performed by outputting the command of standing up the hydraulic pressure of the clutch after the shift operation corresponding to the speed stage after the shift operation to the electromagnetic proportional control valve when the input shaft conversion relative speed obtained by subtracting the input shaft conversion rotational speed in the speed stage after the shift operation of the transmission output shaft rotational speed from the transmission input shaft rotational speed becomes within a predetermined rotational speed threshold close to 0 value. Accordingly, since it is possible to engage the clutch with no shock, the operator does not feel uncomfortable, and it is possible to obtain an excellent drive feeling.

Further, since the shock to the vehicle is reduced due to the reduced number of the shift operation and the reduced shift shock, it is possible to reduce a load drop from a bed of the working vehicle and it is possible to improve a durability of a power train.

Next, a description will be given of a sixth embodiment in accordance with the present invention with reference to the accompanying drawings.

Figure 17:
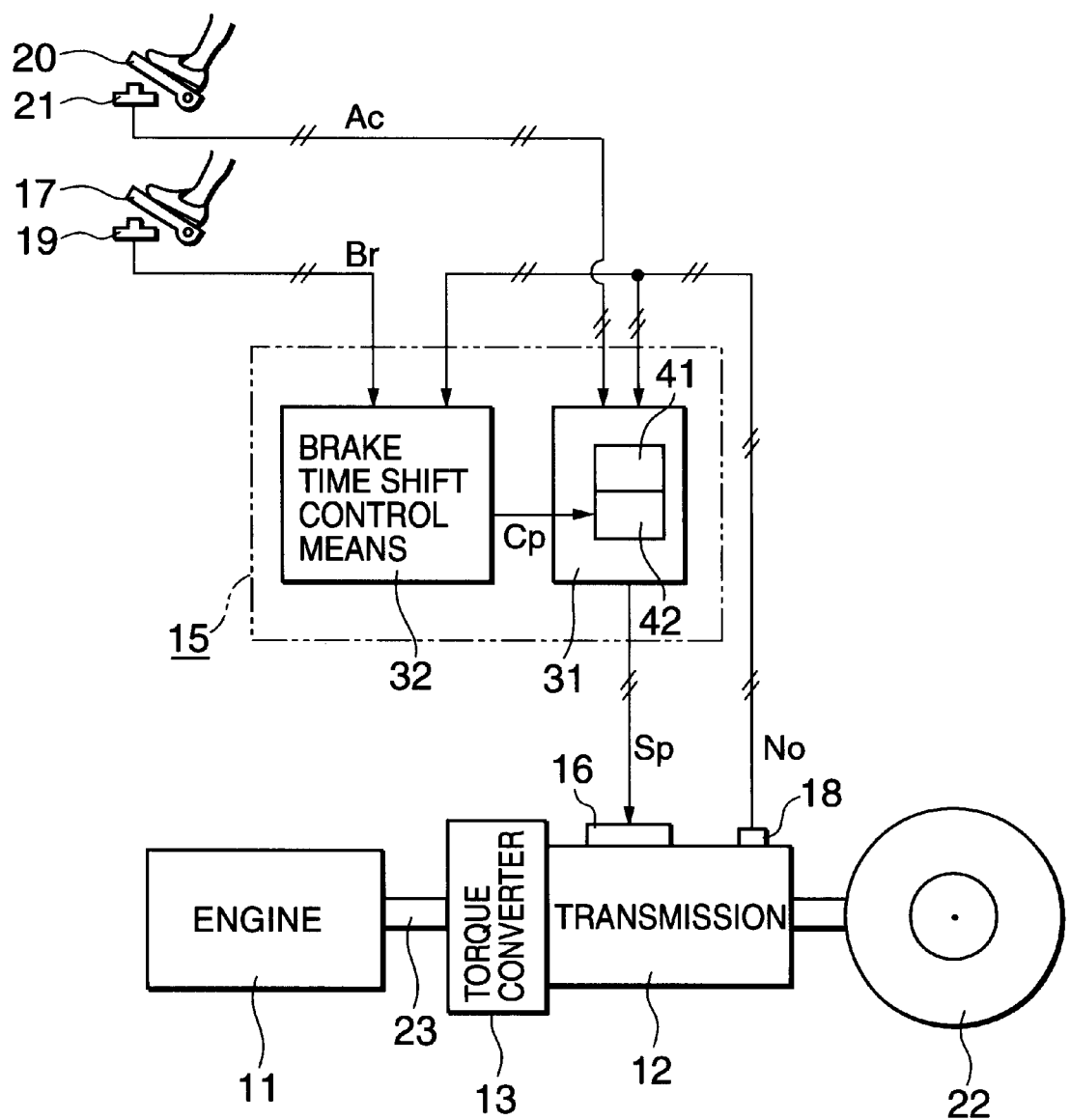
FIG. 17 is a schematic view of a hardware structure in accordance with a sixth embodiment of the present invention.

A hardware structure is shown in FIG. 17. A transmission 12 which engages or disengages a plurality of clutches by turning on and off a clutch hydraulic pressure so as to select a speed stage is mounted to an output shaft 23 of an engine 11 via a torque converter 13. A rear tire wheel 22 corresponding to a drive wheel is mounted to an output shaft of the transmission 12. A plurality of electromagnetic proportional control valves 16 which respectively supply a predetermined hydraulic pressure to a plurality of clutches (not shown) for selecting the speed stage (hereinafter, the electromagnetic proportional control valve 16 in each of the clutches is wholly called as an electromagnetic valve 16) is mounted to a predetermined place of the transmission 12. An accelerator pedal 20 and a brake pedal 17 which an operator actuates are provided close to the operator's feet.

As a detector, a transmission output shaft rotational speed detector 18 (hereinafter, refer to as an output speed detector 18) which measures a transmission output shaft rotational speed No (hereinafter, refer to as an output speed No) is mounted close to a periphery of the transmission output shaft. An accelerator pedal operation amount detector 21 which detects an accelerator pedal operation amount Ac is provided in a lower portion of the accelerator pedal 20. Further, brake pedal operation detector 19 which outputs an on signal when stepping down the brake pedal 17 and outputs an off signal when not stepping down the brake pedal 17 is provided in a lower portion of the brake pedal 17.

The transmission controller 15 is constituted by conventional automatic shift control means 31 and brake time shift control means 32 which controls the shift operation when pedaling down the brake pedal 17.

The automatic shift control means 31 is constituted by a speed stage judging portion 41 which determines a speed stage in accordance with a shift graph (not shown) obtained on the basis of the acceleration pedal operation amount Ac and the output speed No, and an electromagnetic valve signal output portion 42 which outputs an electromagnetic valve signal Sp for controlling a change in point of time of the clutch hydraulic pressure before the shift operation and the clutch hydraulic pressure after the shift operation An accelerator pedal operation amount Ac and an output speed No are input to the speed stage judging portion 41 via an input circuit (not shown). The electromagnetic valve signal Sp is output to the. speed stage judging portion 41 via an input circuit (not shown). The electromagnetic valve signal Sp is output from the electromagnetic valve signal output portion 42 via an output drive portion (not shown).

A brake pedal operation signal Br and the output speed No are input to the control time shift control means 32 for judging a timing of starting the shift operation on the basis of the output speed No and the brake pedal operation signal Br, via an input circuit (not shown). Further, the shift timing command Cp is output from the brake time shift control means 32 to the electromagnetic valve signal output portion 42.

Figure 18:
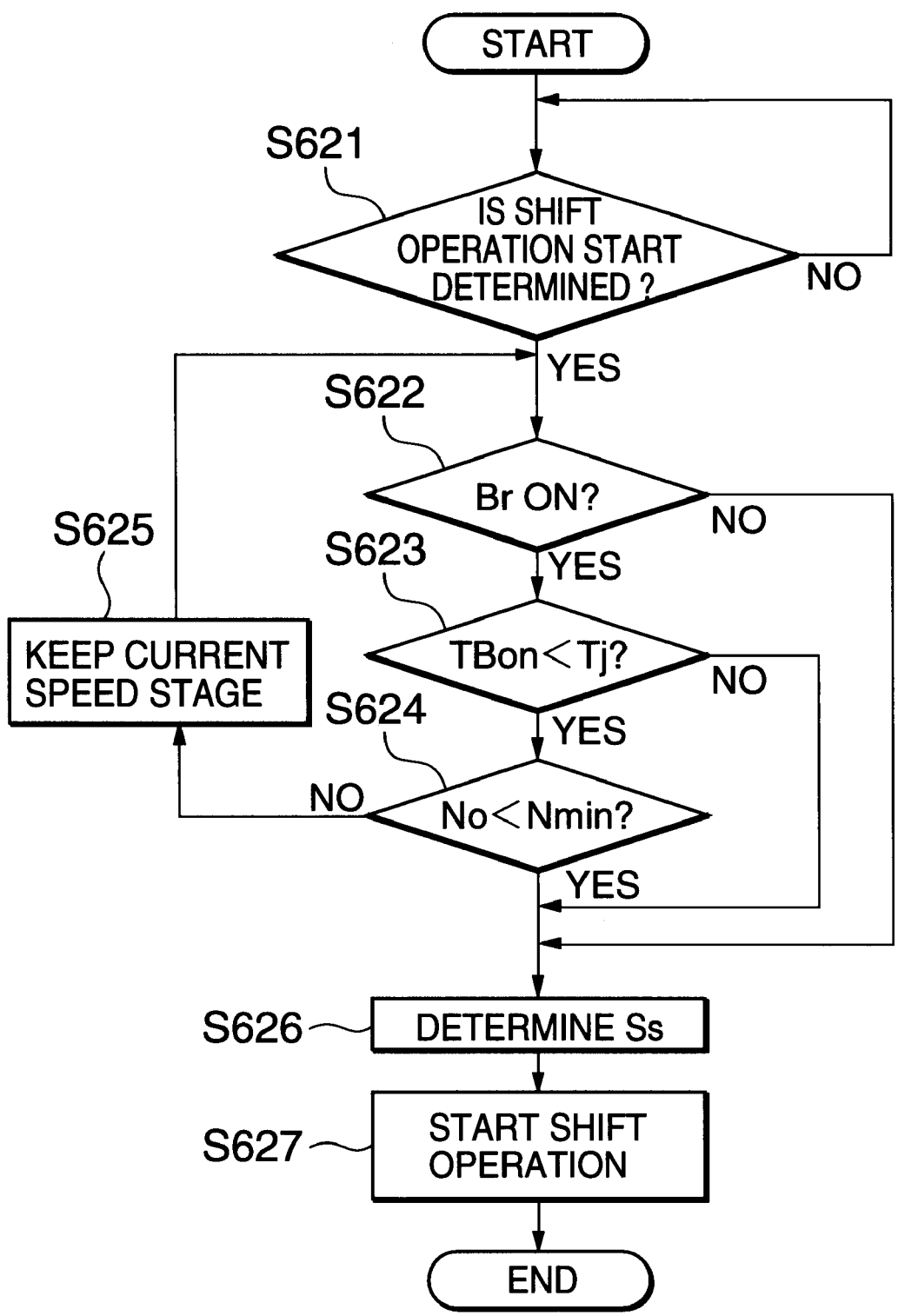
FIG. 18 is a control flow chart of braking time shift control means shown in FIG. 17.

FIG. 18 is a control flow chart of the brake time shift control means 32 shown in FIG. 17, and a process will be described in accordance therewith. In this case, a reference symbol S is attached to a number of each of the process steps in the following description.

At first, it is judged whether or not the shift start is determined in the speed stage judging portion 41 (S621). When the shift is not determined, the process of the step S621 is repeated until the shift is determined. When the shift is determined, it is judged in a step S622 whether or not the brake operation signal Br is on. When it is off, a new speed stage Ss corresponding to the output speed No is determined in the speed stage judging portion 41. Thereafter, the shift timing command Cp for shifting to the new speed stage Ss without passing through the other speed stage is output from the brake time shift control means 32 to the electromagnetic valve signal output portion 42, and the electromagnetic valve signal Sp for turning on and off the clutch corresponding to the new speed stage is output from the electromagnetic valve signal output portion 42 to each of the electromagnetic valves 16 and the shift operation is performed. When the brake operation signal Br is on, it is judged whether or not a brake on time TBon for which the brake operation signal Br is kept on is smaller than a predetermined shift desire judging time Tj (S623).

The shift desire judging time Tj corresponds to a time judged that the operator desires maintaining the current travel speed while traveling on the descending road by stepping down the brake pedal for a time equal to or more than this time.

When the brake on time TBon is smaller than the shift desire judging time Tj, it is judged whether or not the output speed No is smaller than a predetermined start speed stage shift rotational speed Nmin (S624). In this case, the start speed stage shift rotational speed Nmin corresponds to a rotational speed which is set in the shift graph that the shift is changed to the start speed stage used at a time of starting the vehicle a the rotational speed equal to or less than the value. When the output speed No is equal to or more than the start speed stage shift rotational speed Nmin, in a step S625, the step goes back to the step S622 judging whether or not the brake operation signal Br is turned on while keeping the current speed stage. When the output speed No is smaller than the start speed stage shift rotational speed Nmin, the start speed stage is determined to the new speed stage Ss in the speed stage judging portion 41 (S626). Thereafter, the shift timing command Cp for shifting to the start speed stage without passing through the other speed stage is output from the brake time shift control means 32 to the electromagnetic valve signal output portion 42, and the electromagnetic valve signal Sp for turning on and off the clutch corresponding to the new speed stage is output from the electromagnetic valve signal output portion 42 to each of the electromagnetic valves 16 and the shift operation is performed (S627).

In the step S623, when the brake on time TBon is equal to or more than a predetermined shift desire judging time Tj, the new speed stage Ss corresponding to the output speed No at a time of judging that the time is greater than the shift desire judging time Tj is determined in the speed stage judging portion 41 (S626). Thereafter, the shift timing command Cp for shifting to the new speed stage Ss without passing through the other speed stage is output from the brake time shift control means 32 to the electromagnetic valve signal output portion 42, and the electromagnetic valve signal for turning on and off the clutch corresponding to the new speed stage Ss is output from the electromagnetic valve signal output portion to each of the electromagnetic valves 16 and the shift operation is performed (S627).

In this case, the step S626 is the process operation executed by the speed stage judging portion 41 of the conventional shift control means 31, however, a series of process operation is described by including the control flow chart of the brake time shift control means 32.

In accordance with the present embodiment, the operator releases the foot from the accelerator pedal 20 or steps down the brake pedal 17, whereby the vehicle speed is reduced, so that it is judged whether or not the brake pedal 17 is stepped down after it is judged that the output speed No becomes smaller than the normal shift start transmission output shaft rotational speed. When stepping down the brake pedal 17 for a feel uncomfortable and it is possible to rapidly prepare the speed stage at the next start.

Further, when the brake pedal operation signal Br is turned off by releasing the foot from the brake pedal 17, the speed stage is changed to the new speed stage Ss corresponding to the output speed No at a time of releasing the foot from the brake pedal 17 without passing through the other speed stage. Accordingly, since the speed stage is changed to the new speed stage without passing through the other speed stage also at a time of releasing the foot from the brake pedal 17, it is possible to reduce the number of the shift operation and the operator does not feel uncomfortable.

As mentioned above, since the shift operation is not performed during stepping down the brake pedal 17, the number of the shift operation is reduced and the operator does not feel uncomfortable. Further, since the speed stage is changed to the speed stage corresponding to the vehicle speed at a time of releasing the brake pedal 17 without passing through the other speed stage when releasing the brake pedal 17, the number of the shift operation is reduced. Accordingly, it is possible to obtain a shift control apparatus having a good drive operability. Further, since the speed stage is changed to the lower speed stage after the predetermined time has passed and the engine rotational speed is restored even when stepping down the brake pedal 17, it is possible to obtain a shift control apparatus having a sufficient cooling efficiency.

As mentioned above, in accordance with the present invention, when the time obtained by judging the time of stepping down the brake pedal 17 is equal to or more than the time equal to or more than the shift desire judging time Tj, it is judged that the operator continuously steps down the brake pedal 17 for the purpose of traveling on the descending road while maintaining the vehicle speed at that time, and the speed stage is changed to the new speed stage determined by the output speed No after the shift desire judging time Tj has passed from the start time of stepping down the brake pedal 17, without passing through the other speed stage. Accordingly, there is not generated a case that the number of the shift operation is reduced and the operator feels uncomfortable. Further, since the reduced engine rotational speed is increased and restored in accordance with the shift operation, it is possible to secure a predetermined cooling efficiency of a working fluid and a cooling water.

When the time of stepping down the brake pedal 17 has not passed the shift desire judging time Tj, it is judged that the time corresponds to a time for which the operator steps down the brake pedal 17 for reducing the speed or stopping the vehicle. While the output speed No is equal to or more than the start speed stage shift rotational speed Nmin, the current speed stage is continuously maintained. Accordingly, the number of the shift operation is not increased and the operator does not feel uncomfortable. Further, when the output speed No is smaller than the start speed stage shift rotational speed Nmin by continuously stepping down the brake pedal 17 before the shift desire judging time Tj has passed, the speed stage is shifted to the start speed stage without passing through the other speed stage. Accordingly, the number of the shift operation is not increased, the operator does not predetermined time, the speed stage is changed to the speed stage corresponding to the transmission output shaft rotational speed without passing through the other speed stage. Accordingly, since the engine rotational speed is restored, it is possible to secure a cooling efficiency of a working fluid and a cooling water.

When the time of stepping down the brake pedal 17 is smaller than the predetermined time, the shift operation is not performed until the transmission output shaft rotational speed is reduced to the level corresponding to the start speed. Accordingly, since the shift operation is not continuously performed for a short time, it is possible to obtain a shift characteristic which does not apply an uncomfortable feeling to the operator. In this case, even in the case that the time of stepping down the brake pedal 17 is smaller than the predetermined time, the speed stage is changed to the speed stage corresponding to the transmission output shaft rotational speed at a time of releasing the foot from the brake pedal 17 without passing through the other speed stage when releasing the foot from the brake pedal 17. Accordingly, it is possible to reflect the shift intention of the operator at a time of operating the brake pedal 17 to the shift control and it is possible to obtain a shift control apparatus having a good drive operability.

What is claimed is:

1. A shift control apparatus of a working vehicle comprising:

an accelerator pedal operating amount detector;

a controller which outputs a fuel injection amount command signal on the basis of an accelerator operating amount;

a fuel injecting apparatus which injects a fuel on the basis of the fuel injection amount command signal;

an engine having a rotational speed which is controlled in accordance with a fuel injected by the fuel injection apparatus;

a transmission which changes an output rotational speed of the engine in correspondence to a speed stage in accordance with an engagement and a disengagement of a plurality of hydraulic clutches and a combination of a plurality of gears;

a transmission output shaft rotational speed detector;

an electromagnetic proportional control valve which supplies a predetermined hydraulic pressure to each of hydraulic clutches in correspondence to the speed stage of the transmission; and automatic shift control means which determines the speed stage in accordance with a shift graph set on the basis of the acceleration pedal operating amount and the transmission output shaft rotational speed and outputs a command signal to the electromagnetic proportional control valve in correspondence to the speed stage so as to shift, wherein a transmission input shaft rotational speed detector is provided, the transmission input shaft rotational speed signal and the transmission output shaft rotational speed signal are input to the controller, and the controller outputs a command for setting a hydraulic pressure of a clutch before a shift operation to 0 value at a time of starting the shift operation and a command for making a hydraulic pressure of a clutch after the shift operation be gradually increased in point of time to the electromagnetic proportional control valve, changes the fuel injection amount command signal to the fuel injection apparatus from the accelerator injection amount signal on the basis of the accelerator pedal operating amount to a synchronous injection amount signal for controlling the engine rotational speed so that an absolute value of an input shaft conversion relative speed corresponding to a difference between an input transmission input shaft rotational speed and an input shaft conversion rotational speed in a speed stage after the shift operation of an input transmission output shaft rotational speed is reduced, and changes the fuel injection amount command signal from the synchronous injection amount signal to the accelerator injection amount signal when the absolute value of the input shaft conversion relative speed becomes smaller than a predetermined threshold.

2. A shift control apparatus of a working vehicle comprising:

a transmission which shifts in correspondence to a speed stage in accordance with an engagement and a disengagement of a plurality of hydraulic clutches and a combination of a plurality of gears;

an accelerator pedal detector which detects an accelerator pedal operation amount of an operator;

a transmission output shaft rotational speed detector which detects a rotational speed of an output shaft of the transmission;

an electromagnetic proportional control valve which supplies a predetermined hydraulic pressure to each of hydraulic clutches in correspondence to the speed stage of the transmission;

a transmission controller which has a speed stage judging portion for determining the speed stage in accordance with a shift graph set on the basis of the acceleration pedal operating amount and the transmission output shaft rotational speed and outputting a command signal of a clutch hydraulic pressure standup incline with a fixed incline value in correspondence to the determined speed stage, and has an electromagnetic valve signal output portion for driving the electromagnetic proportional control valve in accordance with an input of a command signal;

wherein an engine output torque calculating portion which calculates an engine output shaft torque on the basis of the accelerator pedal operation amount is provided, and the transmission controller is provided with a modulation control portion which detects a vehicle body load, sets the clutch hydraulic pressure standup incline of the command signal output to the electromagnetic proportional control valve in accordance with a magnitude of the detected vehicle body load so that an engagement time between the clutch hydraulic pressure of the clutch after the shift operation determined on the basis of the shift graph in the speed judging portion standing up and the engagement being completed becomes substantially uniform, and outputs the command signal on the basis of the set incline to the electromagnetic proportional control valve via an electromagnetic valve signal output portion.

3. A shift control apparatus of a working vehicle as claimed in claim 2, wherein a transmission input shaft rotational speed detector for detecting an input shaft rotational speed of the transmission is provided, and the modulation control portion is structured such as to output a command of changing the standup incline of the clutch hydraulic pressure to a predetermined incline greater than the standup incline set at a time of starting the shift operation when an absolute value of a difference between the transmission input shaft rotational speed and the input shaft conversion rotational speed in the speed stage after the shift operation of the transmission output shaft rotational speed becomes smaller than a predetermined threshold during standing up the hydraulic pressure of the clutch corresponding to the speed stage after the shift operation, to the electromagnetic proportional control valve via the electromagnetic valve signal output portion.

4. A shift control apparatus of a working vehicle comprising:

a transmission which shifts in correspondence to a speed stage in accordance with an engagement and a disengagement of a plurality of hydraulic clutches and a combination of a plurality of gears;

an accelerator pedal operation amount detector which detects an accelerator pedal operation amount of an operator;

a transmission output shaft rotational speed detector which detects a rotational speed of an output shaft of the transmission;

an electromagnetic proportional control valve which supplies a predetermined hydraulic pressure to each of hydraulic clutches in correspondence to the speed stage of the transmission; and a transmission controller which determines the speed stage after the shift operation in accordance with a shift graph set on the basis of the acceleration pedal operating amount and the transmission output shaft rotational speed and outputs a command signal of a clutch hydraulic pressure in correspondence to the determined speed stage after the shift operation to the electromagnetic proportional control valve so as to shift, wherein a transmission input shaft rotational speed detector for detecting the input shaft rotational speed of the transmission is provided, and the transmission controller is structured such as to output a command of setting the hydraulic pressure of the clutch before the shift operation corresponding to the speed stage before the shift operation to 0 value to the electromagnetic proportional control valve at a time of starting the shift operation when the shift operation to the low speed stage is performed in a state that the accelerator pedal is stepped down and further output a command of standing up the hydraulic pressure of the clutch after the shift operation corresponding to the speed stage after the shift operation to the electromagnetic proportional control valve when an absolute value of the input shaft conversion relative speed obtained by subtracting the input shaft conversion rotational speed in the speed stage after the shift operation of the transmission output shaft rotational speed from the transmission input shaft rotational speed is smaller than a predetermined small speed threshold so as to shift.

5. A shift control apparatus of a working vehicle as claimed in claim 4, wherein the transmission controller can perform a jump shift in which the speed stage is changed from the current speed stage to the speed stage after the shift operation without passing through the middle speed stage, and is structured such as to perform the jump shift when the vehicle acceleration calculated on the basis of the transmission output shaft rotational speed is smaller than a predetermined acceleration threshold and perform the shift operation one step by one step when it is equal to or more than the acceleration threshold.

6. A shift control apparatus of a working vehicle as claimed in claim 4, wherein a vehicle weight detector which detects a weight of the vehicle or an acceleration detector for detecting an acceleration of the vehicle in a forward moving direction is provided, an engine controller which calculates an engine output torque on the basis of an accelerator pedal operation amount and outputs the calculated engine output torque to the transmission controller is provided, and the transmission controller can perform a jump shift in which the speed stage is changed from the current speed stage to the speed stage after the shift operation without passing through the middle speed stage, and is structured such as to determine the speed stage after the shift operation on the basis of an input engine output torque, a vehicle acceleration calculated on the basis of the transmission output shaft rotational speed, and any one of a required traction force calculated on the basis of the vehicle weight detected by the vehicle weight detector and the vehicle acceleration detected by the acceleration detector, perform a jump shift when the determined speed stage after the shift operation is not adjacent to the current speed stage, and perform the shift operation one step by one step when it is adjacent thereto.

7. A shift control apparatus of a working vehicle comprising:

a transmission which shifts in correspondence to a speed stage in accordance with an engagement and a disengagement of a plurality of hydraulic clutches and a combination of a plurality of gears;

an accelerator pedal operation amount detector;

a transmission output shaft rotational speed detector;

an electromagnetic proportional control valve which supplies a predetermined hydraulic pressure to each of hydraulic clutches in correspondence to the speed stage of the transmission; and a transmission controller which determines the speed stage in accordance with a shift graph set on the basis of the acceleration pedal operating amount and the transmission output shaft rotational speed and outputs a command signal to the electromagnetic proportional control valve in correspondence to the determined speed stage so as to shift the transmission, wherein the improvement comprises:

a brake pedal operation detector which detects an operation of the brake pedal and outputs a brake operation signal; and braking time shift control means which keeps the speed stage at a time when the brake operation signal is turned on and shifts the speed stage from the speed stage at the on time to the speed stage corresponding to the transmission output shaft rotational speed at a time when the brake is turned off, when the brake operation signal is turned off from the on state without passing through the other speed stage.

8. A shift control apparatus of a working vehicle as claimed in claim 7, wherein the braking time shift control means is further structured such as to keep the speed stage at a time when the brake operation signal is turned on until a predetermined time after the brake operation signal is turned on, and shift to the speed stage corresponding to the transmission output shaft rotational speed at a time when the predetermined time has passed without passing through the other speed stage.

9. A shift control apparatus of a working vehicle as claimed in claim 7, wherein the braking time shift control means is further structured such as to shift from the speed stage at a time when the brake operation signal is turned on to the starting speed stage without passing through the other speed stage, when the transmission output shaft rotational speed becomes smaller than a predetermined rotational speed set for the purpose of shifting to a predetermined starting speed stage used at a time of starting the vehicle, during the predetermined time has passed after the brake operation signal is turned on.

* * * * *